(12) United States Patent
Bedrich et al.

(10) Patent No.: US 12,334,867 B2
(45) Date of Patent: Jun. 17, 2025

(54) METHOD, SYSTEM, AND IMAGE PROCESSING DEVICE FOR CAPTURING AND/OR PROCESSING ELECTROLUMINESCENCE IMAGES, AND AN AERIAL VEHICLE

(71) Applicant: Quantified Energy Labs Pte. Ltd., Singapore (SG)

(72) Inventors: Karl Georg Bedrich, Singapore (SG); Yong Sheng Khoo, Singapore (SG); Yan Wang, Singapore (SG)

(73) Assignee: Quantified Energy Labs Pte. Ltd., Singapore (SG)

( * ) Notice: Subject to any disclaimer, the term of this patent is extended or adjusted under 35 U.S.C. 154(b) by 268 days.

(21) Appl. No.: 17/783,028

(22) PCT Filed: Dec. 30, 2020

(86) PCT No.: PCT/SG2020/050790
§ 371 (c)(1),
(2) Date: Jun. 7, 2022

(87) PCT Pub. No.: WO2021/137764
PCT Pub. Date: Apr. 8, 2021

(65) Prior Publication Data
US 2023/0005115 A1    Jan. 5, 2023

(30) Foreign Application Priority Data

Dec. 31, 2019   (SG) .............................. 10201914038S

(51) Int. Cl.
*G06T 5/50* (2006.01)
*B64D 47/08* (2006.01)
(Continued)

(52) U.S. Cl.
CPC .............. *H02S 50/00* (2013.01); *B64D 47/08* (2013.01); *G05D 1/0094* (2013.01); *G06T 5/50* (2013.01);
(Continued)

(58) Field of Classification Search
CPC ......... H02S 50/00; H02S 50/15; B64D 47/08; G05D 1/0094; G06T 5/50; G06T 7/0002;
(Continued)

(56) References Cited

U.S. PATENT DOCUMENTS

| 10,313,575 B1 | 6/2019 | Wingo et al. |
| 2005/0244081 A1 | 11/2005 | Zhou et al. |

(Continued)

FOREIGN PATENT DOCUMENTS

| CN | 105721862 A | 6/2016 |
| CN | 108418554 A | 8/2018 |

(Continued)

OTHER PUBLICATIONS

The Extended European Search Report for European Patent Application No. 20910164.1, Feb. 6, 2024, 5 Pages.

(Continued)

*Primary Examiner* — Iriana Cruz
(74) *Attorney, Agent, or Firm* — Botos Churchill IP Law LLP

(57) ABSTRACT

A method (400) of capturing and processing electroluminescence (EL) images (1910) of a PV array (40) is disclosed herein. In a described embodiment, the method 400 includes controlling the aerial vehicle (20) to fly 210 along a flight path to capture EL images (1910) of corresponding PV array subsections (512b) of the PV array (40), deriving respective image quality parameters from at least some of the captured EL images, dynamically adjusting a flight speed of the aerial vehicle along the flight path, based on the respective image (Continued)

quality parameters for capturing the EL images (1910) of the PV array subsections (512*b*), extracting a plurality of frames (1500) of the PV array subsection (512*b*) from the EL images (1910); determining a reference frame having a highest image quality of the PV array subsection (512*b*) from among the extracted frames (2100); performing image alignment of the extracted frames (2100) to the reference frame to generate image aligned frames (2130), and processing the image aligned frames (2130) to produce an enhanced image (2140) of the PV array subsection (512*b*) having a higher resolution than the reference frame. A system, image processing device, and aerial vehicle for the method thereof are also disclosed.

19 Claims, 15 Drawing Sheets

(51) Int. Cl.

| | | |
|---|---|---|
| *G05D 1/00* | (2006.01) | |
| *G06T 7/00* | (2017.01) | |
| *G06T 7/33* | (2017.01) | |
| *G06T 7/73* | (2017.01) | |
| *G06V 10/82* | (2022.01) | |
| *G06V 20/10* | (2022.01) | |
| *G06V 20/17* | (2022.01) | |
| *H02S 50/00* | (2014.01) | |
| *H04N 5/232* | (2006.01) | |
| *H04N 23/61* | (2023.01) | |
| *H04N 23/67* | (2023.01) | |
| *H04N 23/695* | (2023.01) | |
| *B64U 101/30* | (2023.01) | |

(52) U.S. Cl.
CPC ............ *G06T 7/0002* (2013.01); *G06T 7/337* (2017.01); *G06T 7/74* (2017.01); *G06V 10/82* (2022.01); *G06V 20/10* (2022.01); *G06V 20/17* (2022.01); *G06V 20/176* (2022.01); *H04N 23/61* (2023.01); *H04N 23/67* (2023.01); *H04N 23/695* (2023.01); *B64U 2101/30* (2023.01); *G06T 2207/10032* (2013.01); *G06T 2207/20084* (2013.01); *G06T 2207/20164* (2013.01); *G06T 2207/20216* (2013.01); *G06T 2207/30168* (2013.01)

(58) Field of Classification Search
CPC ................. G06T 7/337; G06T 7/74; G06T 2207/10032; G06T 2207/20084; G06T 2207/20164; G06T 2207/20216; G06T 2207/30168; G06T 2207/10016; G06T 3/4038; G06T 3/4053; G06T 5/60; G06V 10/82; G06V 20/10; G06V 20/17; G06V 20/176; H04N 23/61; H04N 23/67; H04N 23/695; B64U 2101/30; B64U 2201/10; G06F 18/23; G06F 18/2414; G01N 2201/0214; G01N 21/66; G01C 11/02

See application file for complete search history.

(56) References Cited

U.S. PATENT DOCUMENTS

| | | | |
|---|---|---|---|
| 2010/0266196 | A1 | 10/2010 | Kasahara et al. |
| 2017/0184524 | A1* | 6/2017 | Uetaki .................. G05D 1/106 |
| 2017/0334559 | A1 | 11/2017 | Bouffard et al. |
| 2018/0158199 | A1* | 6/2018 | Wang ........................ G06T 3/18 |
| 2020/0042833 | A1* | 2/2020 | Toor ........................ G06N 3/063 |
| 2021/0126582 | A1* | 4/2021 | Shue .................. G06Q 10/0833 |
| 2021/0390696 | A1* | 12/2021 | Iwase ........................ G06T 5/60 |
| 2022/0205938 | A1* | 6/2022 | Michini ................. G05D 1/689 |
| 2022/0343599 | A1* | 10/2022 | Millin .................... G01C 11/34 |

FOREIGN PATENT DOCUMENTS

| | | |
|---|---|---|
| EP | 3136090 A1 | 3/2017 |
| JP | 2013010499 A | 1/2013 |
| JP | 2014203428 A | 10/2014 |
| JP | 2017158116 A | 9/2017 |
| JP | 2019180120 A | 10/2019 |
| WO | 2018212008 A1 | 11/2018 |
| WO | 2019144317 A1 | 8/2019 |
| WO | 2019176467 A1 | 9/2019 |

OTHER PUBLICATIONS

The International Preliminary Report on Patentability (Chapter II of the Patent Cooperation Treaty) for PCT/SG2020/050790, Nov. 2, 2021.
The International Search Report and The Written Opinion of the International Searching Authority for International Application No. PCT/SG2020/050790, Date of Mailing: Mar. 30, 2021.
Notice of Reasons for Rejection for Japanese Patent Application No. 2022-540945, Dec. 2, 2024, 8 Pages.

* cited by examiner

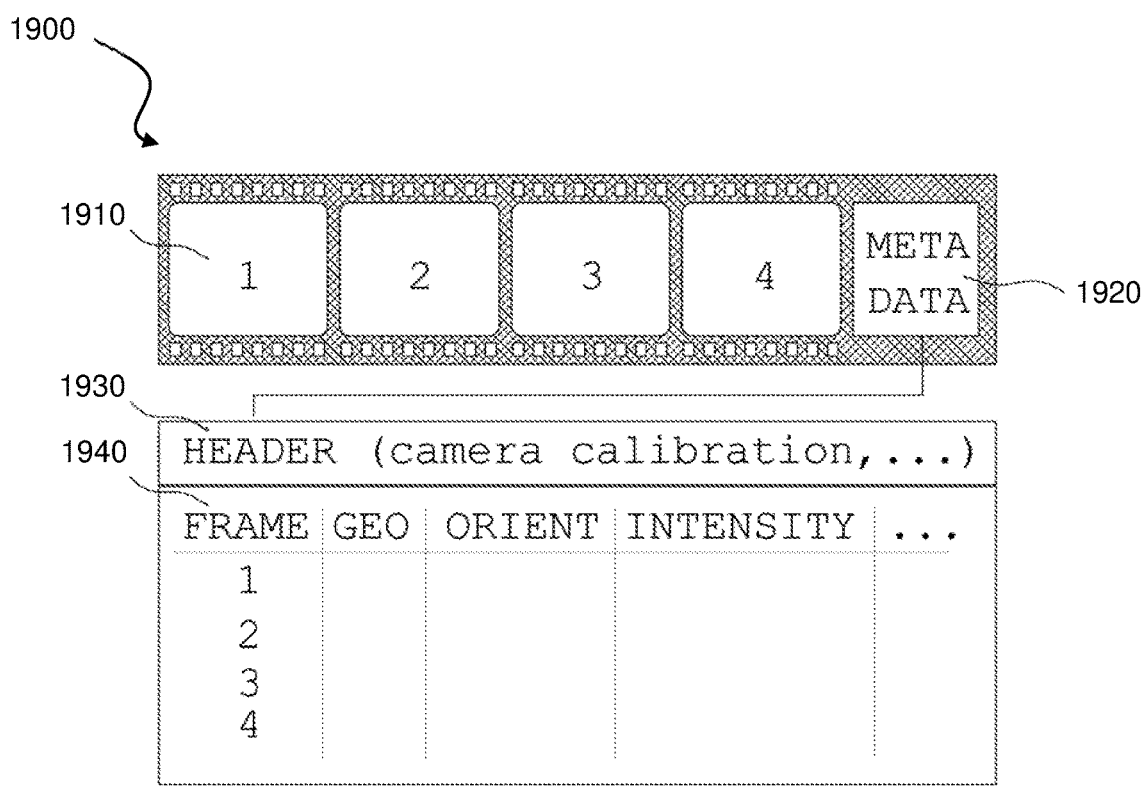
Figure 20
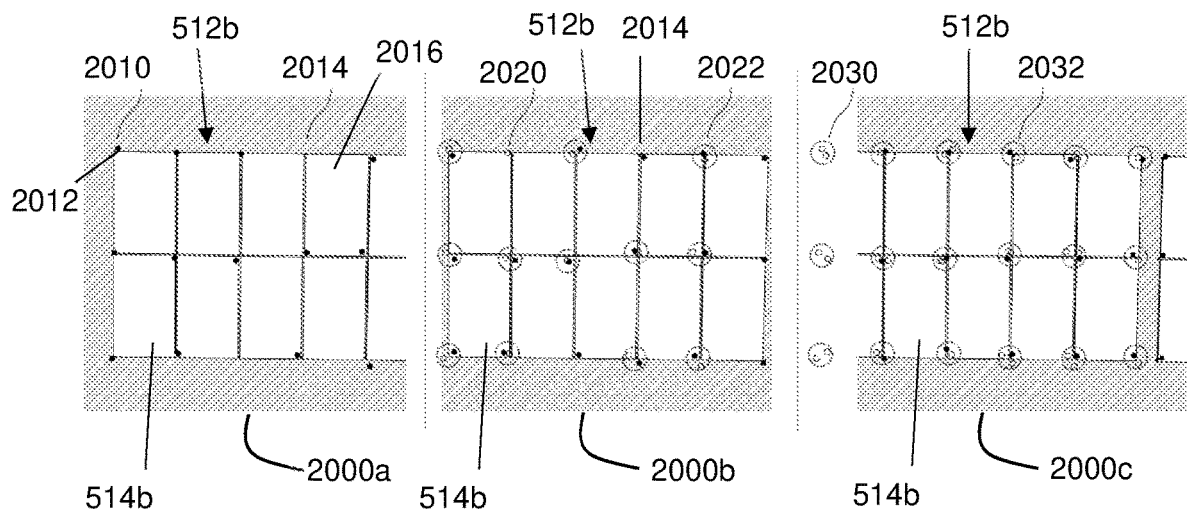
Figure 21A  Figure 21B  Figure 21C
Figure 21

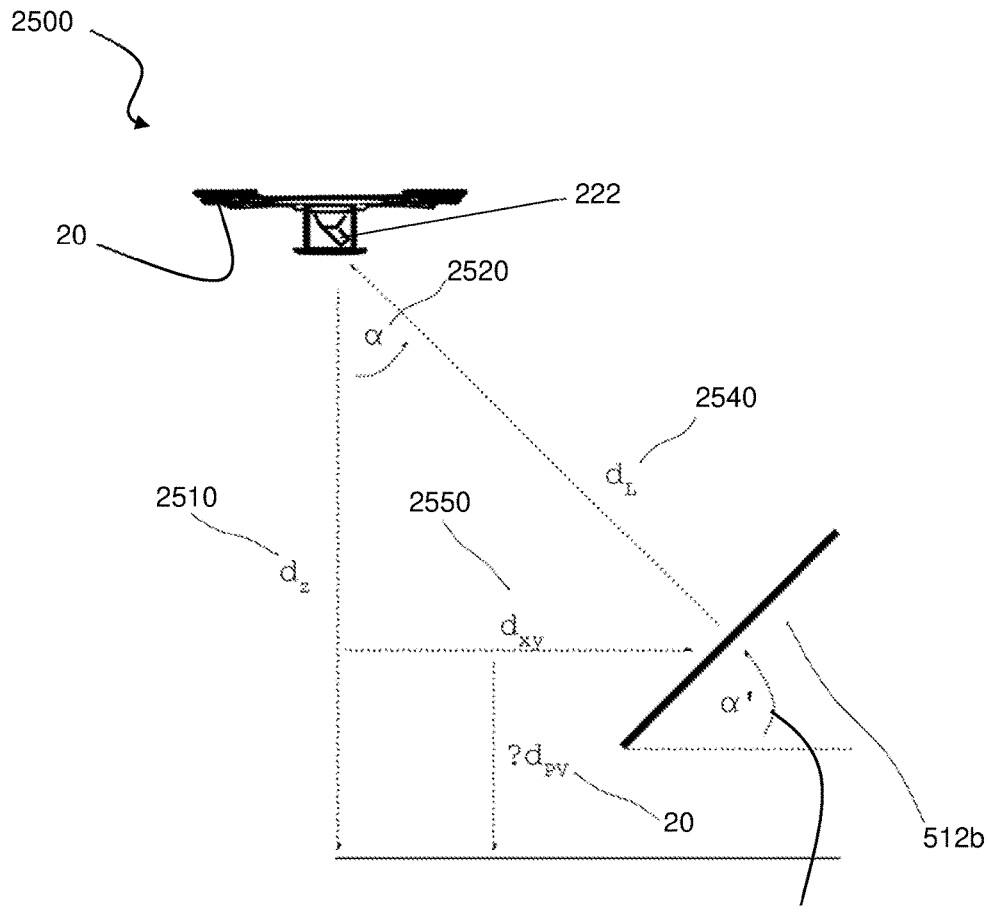
Figure 27
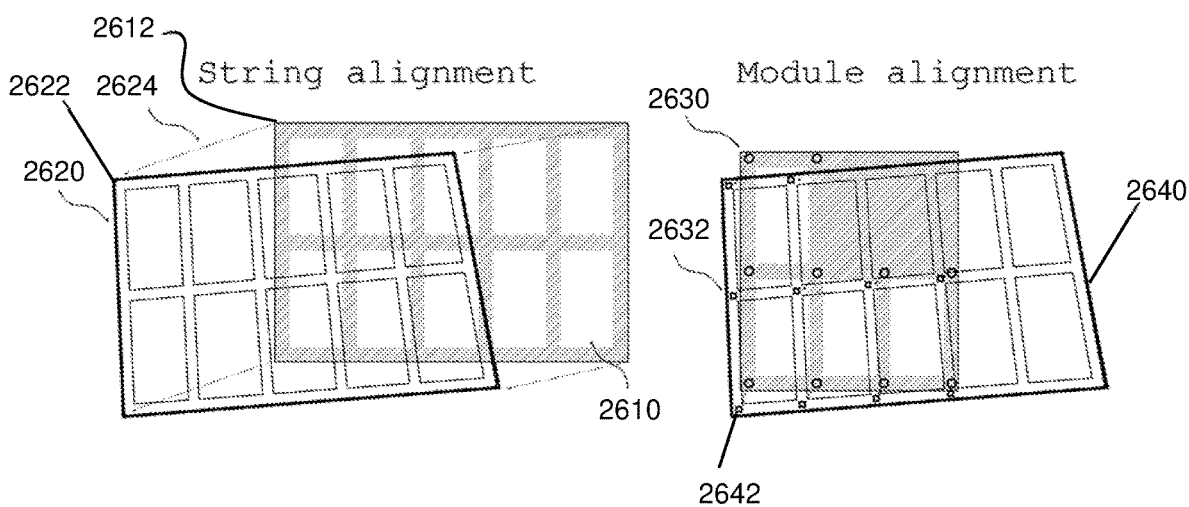
Figure 28A
Figure 28B

METHOD, SYSTEM, AND IMAGE PROCESSING DEVICE FOR CAPTURING AND/OR PROCESSING ELECTROLUMINESCENCE IMAGES, AND AN AERIAL VEHICLE

CROSS-REFERENCE TO RELATED APPLICATIONS

The present application is a national phase entry under 35 U.S.C. § 371 of International Application No. PCT/SG2020/050790, filed Dec. 30, 2020, published in English, which claims the benefit of the filing date of Singapore Patent Application No. 10201914038S, filed Dec. 31, 2019, the disclosures of which are incorporated herein by reference.

TECHNICAL FIELD

The present application relates to methods for capturing and processing electroluminescence (EL) images of a photovoltaic (PV) array, an aerial vehicle for capturing the EL images, and an image processing device for processing the EL images.

BACKGROUND

Solar panels have found widespread use globally. However, due to high initial capital investment cost, solar panels installed in the field must work properly and efficiently for a period to ensure return on investment. Hence, it is important to maintain the quality of solar panels installed in the field. Due to the mass deployment of solar panels in solar farms (or generally photovoltaic (PV) plants), and the remote deployment of solar panels such as on the roof of houses, it is often difficult to monitor the performance of individual solar panels. Various imaging technologies such as visual, thermal (infrared), ultra-violet (UV) fluorescence, photoluminescence (PL) and electroluminescence (EL) imaging are available to detect defects of solar panels. For example, EL inspection is used during PV manufacturing for quality control.

For EL measurements, PV modules of the solar panels are connected to a power supply and put under forward bias. The emitted near-infrared light is captured with a camera that is sensitive in the near-infrared waveband. For on-site inspection, EL imaging has also been used on a sampling basis. One of the common methods for on-site EL inspection is using a mobile trailer. In this method, the mobile trailer which carries a darkroom is deployed on-site. PV modules are taken down from their installed position for measurement in the darkroom inside the trailer. This method ensures that the EL measurements of PV modules are taken in a controlled environment. However, as the PV modules must be dismounted, large scale inspection using this method is time consuming and not feasible. Additionally, there is the risk of introducing defects during module handling.

Another method of EL inspection is performed at night using a camera mounted on a tripod, respective during the day, with lock-in current control. While this method does not require dismounting of PV modules from their support frame, it is also time consuming and highly labour intensive. Additionally, perspective and intensity distortions of captured images may result from the limitations of capturing images from a camera mounted to a tripod.

Therefore, it is desirable to provide a solution that addresses at least one of the problems mentioned in existing prior art, and/or to provide the public with a useful alternative.

SUMMARY

According to a first aspect, there is provided a method of processing electroluminescence (EL) images of a PV array. The method includes (i) extracting a plurality of frames of a PV array subsection of the PV array from the EL images, the PV array subsection including one or more PV modules of the PV array, (ii) determining a reference frame having a highest image quality of the PV array subsection from among the extracted frames, (iii) performing image alignment of the extracted frames to the reference frame to generate image aligned frames, and (iv) processing the image aligned frames to produce an enhanced image of the PV array subsection having a higher resolution than the reference frame.

The described embodiment is able to take low resolution, mono-chromatic images, and videos under dim light conditions or in the absence of natural light such as during the night, and yet enhanced resolution and noise reduced images may be produced to identify defective PV modules. In general, and if averaging is used, magnitude of noise in the images processed may be reduced by roughly the square root of the number of images averaged. As a result, in general enhanced images of higher image quality may be achieved.

Specifically, extracting the frames from the images may include determining respective corner points of each PV module in the images, and constructing respective frames for each PV module based on the identified corner points of each PV module.

In a specific embodiment, determining respective corner points of each PV module in the images may include clustering the respective corner points of a particular PV module that is repeated in different images, and computing respective averaged positions for each cluster of respective corner points.

Preferably, determining a reference frame having a highest image quality may include evaluating the image quality of each frame based on at least one of sharpness, signal-to-noise ratio, and completeness of the frames.

The method may also include arranging the extracted frames in a stacked arrangement before performing image alignment. Further, the respective corner points of the PV modules may be stacked in the stacked arrangement, and performing image alignment may include aligning the respective corner points of each PV module in the extracted frames to the corresponding corner points of the PV module in the reference frame It is envisaged that processing the image aligned frames may include grouping the image aligned frames according to the PV module in each frame, and performing image averaging on each group of image aligned frames to obtain respective enhanced frames for each PV module.

Moreover, the image averaging may be based on weighted image stack averaging, and/or a deep convolutional neural network structure.

The method may further include associating each enhanced frame with a horizontal index and a vertical index according to each PV module's position in the PV array subsection, and arranging the enhanced frames according to its horizontal and vertical index to produce the enhanced image of the PV array subsection.

The method may also include scaling respective image intensities of each enhanced frame. Additionally, the method may also include mapping the enhanced image of the PV array subsection onto a base-map of the PV array subsection. The base-map may include geo-location of each PV module.

In a specific embodiment, mapping the enhanced image onto the base-map may further include orientating the enhanced image to align the PV array subsection in the enhanced image to the PV array subsection in the base-map.

Furthermore, each EL image of the PV array subsection may include an image identifier, and orientating the enhanced image may include associating the image identifier of a particular EL image with each enhanced frame having its PV module featured in the particular EL image, and determining an orientation of the enhanced image based on the image identifiers associated with each enhanced frame.

The geo-location may include GPS coordinates.

Moreover, the plurality of frames may be consecutive frames of the PV array subsection.

According to a second aspect, there is provided an image processing device for processing EL images of a PV array. The image processing device includes an image processor configured to extract a plurality of frames of a PV array subsection of the PV array from the EL images, the PV array subsection including one or more PV modules of the PV array, determine a reference frame having a highest image quality of the PV array subsection from among the extracted frames, perform image alignment of the extracted frames to the reference frame to generate image aligned frames, and process the image aligned frames to produce an enhanced image of the PV array subsection having a higher resolution and lower noise level than the reference frame.

The image processor may be further configured to extract the frames from the images by determining respective corner points of each PV module in the images, and constructing respective frames for each PV module based on the identified corner points of each PV module.

Preferably, the image processor may be further configured to determine respective corner points of each PV module in the images by clustering the respective corner points of a particular PV module that may be repeated in different images, and computing respective averaged positions for each cluster of respective corner points.

The image processor may also be further configured to determine a reference frame having a highest image quality by evaluating the image quality of each frame based on at least one of sharpness, signal-to-noise ratio, and completeness of the frames.

Additionally, the image processor may be further configured to arrange the extracted frames in a stacked arrangement before performing image alignment.

Furthermore, the respective corner points of the PV modules may be stacked in the stacked arrangement, and the image processor may be further configured to perform image alignment by aligning the respective corner points of each PV module in the extracted frames to the corresponding corner points of the PV module in the reference frame.

In a specific embodiment, the image processor may be further configured to process the image aligned frames by grouping the image aligned frames according to the PV module in each frame, and perform image averaging on each group of image aligned frames to obtain respective enhanced frames for each PV module.

Moreover, the image processor may be configured to perform image averaging based on weighted image stack averaging, and/or a deep convolutional neural network structure.

The image processor may also be configured to associate each enhanced frame with a horizontal index and a vertical index according to each PV module's position in the PV array subsection, and arrange the enhanced frames according to its horizontal and vertical index to produce the enhanced image of the PV array subsection.

The image processor may be configured to scale respective image intensities of each enhanced frame.

The image processor may be further configured to map the enhanced image of the PV array subsection onto a base-map of the PV array subsection. The base-map may then include geo-location of each PV module. In addition, the image processor may be configured to map the enhanced image onto the base-map by orientating the enhanced image to align the PV array subsection in the enhanced image to the PV array subsection in the base-map.

Furthermore, each EL image of the PV array subsection may include an image identifier, and the image processor may be configured to orientate the enhanced image by associating the image identifier of a particular EL image with each enhanced frame having its PV module featured in the particular EL image, and determining an orientation of the enhanced image based on the image identifiers associated with each enhanced frame.

The geo-location may include GPS coordinates. Additionally, the plurality of frames may be consecutive frames of the PV array subsection.

According to a third aspect, there is provided a method of controlling movement of an aerial vehicle having a camera for capturing EL images of a PV array. The method includes controlling the aerial vehicle to fly along a flight path to capture EL images of corresponding PV array subsections of the PV array, deriving respective image quality parameters from at least some of the captured EL images, and dynamically adjusting a flight speed of the aerial vehicle along the flight path, based on the respective image quality parameters for capturing the EL images of the PV array subsections.

Advantageously, by dynamically adjusting the aerial vehicle's flight speed according to image quality parameters derived from at least some of the captured EL images, the aerial vehicle is able to adjust its flights speed so that it is possible to capture EL images with higher image quality such as better signal-to-noise ratio or image clarity.

The image quality parameters may include a SNR scanning factor and a motion blur scanning factor. In a specific example, the SNR scanning factor may be dependent on a target SNR, a measured SNR, and an estimated number of EL images captured that include a particular PV module of the PV array subsection.

On the other hand, the motion blur scanning factor may be a ratio of a measured object deflection to a predefined maximum object deflection.

Preferably, dynamically adjusting a flight speed of the aerial vehicle along the flight path, based on the respective image quality parameters may include deriving a target flight speed based on a minimum of the SNR scanning factor and the motion blur scanning factor, and dynamically adjusting the current flight speed of the aerial vehicle to match the target flight speed.

Additionally, deriving the target flight speed may include applying the minimum of the SNR scanning factor and the motion blur scanning factor to a current flight speed of the aerial vehicle to derive a target scanning speed, and selecting the target scanning speed as the target flight speed if the target scanning speed may be below a maximum flight speed of the aerial vehicle.

The method may further include selecting the maximum flight speed as the target flight speed if the target scanning speed exceeds the maximum flight speed of the aerial vehicle.

The method may also include adjusting the target flight speed based on a user input factor.

Additionally, the method may further include detecting an EL signal emitted by one or more PV modules from the PV array, prior to controlling the aerial vehicle to fly along the flight path to capture EL images of corresponding PV array subsections of the PV array.

The method may also include maneuvering the aerial vehicle to an initial position wherein the aerial vehicle's yaw axis and the camera's optical axis may be perpendicular to the ground before detecting the EL signal.

Further, the method may include navigating the aerial vehicle to the EL signal's location.

In a specific embodiment, detecting the EL signal emitted by the one or more PV modules of the PV array may include rotating the aerial vehicle about the vehicle's yaw axis while simultaneously increasing the camera's optical axis angle until the EL signal may be detected.

The camera's optical axis angle may be increased from 0° to 70°. It is envisaged that the camera's optical axis angle may then be increased at a decreasing pitch speed.

Preferably, the aerial vehicle may also rotate at a decreasing yaw speed.

The method may further include maneuvering the aerial vehicle to a predefined elevation before rotating the aerial vehicle.

The method may also include aligning the camera's field-of-view (FOV) to the corresponding PV array subsections by determining respective key points of a reference PV module in the corresponding PV array subsections, deriving target aligned points from the respective key points for the camera's FOV to be aligned to the corresponding PV array subsections, performing a perspective transformation to align the respective key points to the target aligned points, and maneuvering the aerial vehicle relative to the corresponding PV array subsections based on the perspective transformation.

Furthermore, aligning the camera's FOV to the corresponding PV array subsections further may include maneuvering the aerial vehicle to an appropriate elevation, wherein the corresponding PV array subsections may be at a predefined size ratio within the camera's FOV at the appropriate elevation.

The corresponding PV array subsections may occupy 80% to 90% of the camera's FOV at the predefined size ratio.

In addition, the method may further include dynamically adjusting the camera's focus according to a measured image sharpness.

The aerial vehicle further may include a light source aligned with the camera's optical axis, and the method further may include powering the light source except while capturing the EL images of the PV array.

According to a fourth aspect, there is provided an aerial vehicle including a camera for capturing EL images of a PV array, a propulsion device for actuating movement of the aerial vehicle, and a controller communicatively coupled to the camera and the propulsion device. The controller is configured to control the aerial vehicle to fly along a flight path to capture EL images of corresponding PV array subsections of the PV array, deriving respective image quality parameters from at least some of the captured EL images, and dynamically adjusting a flight speed of the aerial vehicle along the flight path, based on the respective image quality parameters for capturing the EL images of the PV array subsections.

The image quality parameters may then include a SNR scanning factor and a motion blur scanning factor. Preferably, the SNR scanning factor may be dependent on a target SNR, a measured SNR, and an estimated number of EL images captured that include a particular PV module of the PV array subsection.

On the other hand, the motion blur scanning factor may be a ratio of a measured object deflection to a predefined maximum object deflection.

Preferably, the controller may be further configured to dynamically adjusting a flight speed of the aerial vehicle along the flight path, based on the respective image quality parameters by deriving a target flight speed based on a minimum of the SNR scanning factor and the motion blur scanning factor, and dynamically adjusting the current flight speed of the aerial vehicle to match the target flight speed.

The controller may also be configured to deriving the target flight speed by applying the minimum of the SNR scanning factor and the motion blur scanning factor to a current flight speed of the aerial vehicle to derive a target scanning speed, and selecting the target scanning speed as the target flight speed if the target scanning speed may be below a maximum flight speed of the aerial vehicle.

Additionally, the controller may be configured to select the maximum flight speed as the target flight speed if the target scanning speed exceeds the maximum flight speed of the aerial vehicle.

The controller may also be configured to adjust the target flight speed based on a user input factor.

Moreover, the controller may be further configured to detect an EL signal emitted by one or more PV modules from the PV array, the PV array having an array axis, and the one or more PV modules being aligned to the array axis and may include a planar surface, determine the array axis of the PV array, and control the camera to capture the EL images of the PV array along the array axis while dynamically adjusting the propulsion device to align the camera's optical axis to be perpendicular to the one or more PV module's planar surface.

Furthermore, the controller may be configured to set the aerial vehicle to an initial position before locating the EL signal by dynamically adjusting the propulsion device to set the aerial vehicle's yaw axis to be perpendicular to the ground, and dynamically adjusting the camera's optical axis to be perpendicular to the ground.

The controller may also be configured to dynamically adjust the propulsion device to navigate the aerial vehicle to the EL signal's location.

The controller may be further configured to locate the EL signal emitted by the one or more PV modules of the PV array by dynamically adjust the propulsion device to rotate the aerial vehicle about the vehicle's yaw axis while simultaneously increasing the camera's optical axis angle until the EL signal may be located.

The camera's optical axis angle may be increased from 0° to 70°. Specifically, the camera's optical axis angle may then be increased at a decreasing pitch speed. Preferably, the aerial vehicle may also rotate at a decreasing yaw speed.

The controller may be further configured to dynamically adjust the propulsion device to maneuver the aerial vehicle to a predefined elevation before rotating the aerial vehicle.

Additionally, the controller may be configured to align the camera's field-of-view (FOV) to the corresponding PV array subsections by determining respective key points of a reference PV module in the corresponding PV array subsections, deriving target aligned points from the respective key points for the camera's FOV to be align to the corresponding PV array subsections, performing a perspective transformation to align the respective key points to the target aligned points, and dynamically adjusting the propulsion device to maneuver the aerial vehicle relative to the corresponding PV array subsection based on the perspective transformation.

The controller may also be configured to align the camera's FOV to the corresponding PV array subsections by dynamically adjusting the propulsion device to maneuver the aerial vehicle to an appropriate elevation, wherein the corresponding PV array subsections may be at a predefined size ratio within the camera's FOV at the appropriate elevation.

The corresponding PV array subsections may occupy 80% to 90% of the camera's FOV at the predefined size ratio.

The controller may be further configured to dynamically adjust the camera's focus according to a measured image sharpness.

Additionally, the aerial vehicle may further include a light source aligned with the camera's optical axis, and the controller may be further configured to power the light source except while capturing the EL images of the PV array.

According to a fifth aspect, there is provided a method of obtaining an enhanced image of a PV array subsection of a PV array from EL images of the PV array subsection captured by an aerial vehicle having a camera. The method includes (i) controlling the aerial vehicle to fly along a flight path to capture EL images of corresponding PV array subsections of the PV array, deriving respective image quality parameters from at least some of the captured EL images, dynamically adjusting a flight speed of the aerial vehicle along the flight path, based on the respective image quality parameters for capturing the EL images of the PV array subsections, (iv) extracting a plurality of frames of the PV array subsection from the EL images, (v) determining a reference frame having a highest image quality of the PV array subsection from among the extracted frames, (vi) performing image alignment of the extracted frames to the reference frame to generate image aligned frames, and (vii) processing the image aligned frames to produce an enhanced image of the PV array subsection having a higher resolution than the reference frame.

According to a sixth aspect, there is provided a system for capturing and processing EL images of a PV array subsection of a PV array. The system includes an aerial vehicle and an image processing device. The aerial vehicle includes a camera for capturing EL images of a PV array, a propulsion device for actuating movement of the aerial vehicle, and a controller communicatively coupled to the camera and the propulsion device, and configured to control the aerial vehicle to fly along a flight path to capture EL images of corresponding PV array subsections of the PV array, deriving respective image quality parameters from at least some of the captured EL images, and dynamically adjusting a flight speed of the aerial vehicle along the flight path, based on the respective image quality parameters for capturing the EL images of the PV array subsections. The image processing device includes an image processor configured to extract a plurality of frames of a PV array subsection of the PV array from the EL images, the PV array subsection including one or more PV modules of the PV array, determine a reference frame having a highest image quality of the PV array subsection from among the extracted frames, perform image alignment of the extracted frames to the reference frame to generate image aligned frames, and process the image aligned frames to produce an enhanced image of the PV array subsection having a higher resolution than the reference frame.

BRIEF DESCRIPTION OF DRAWINGS

Exemplary embodiments will be described with reference to the accompanying drawings in which:

FIGS. 15A to 15F, is a series of six consecutive EL images of the PV string captured by the camera during a SCAN function as part of the exemplary method of FIG. 4;

FIGS. 19A, 19B, 19C, 19D and 19E are schematic diagrams showing a time lapse of the UAV performing an AUTO function as part of the exemplary method of FIG. 4;

FIG. 20 is a schematic diagram of a file structure for the stored EL images that are captured during the AUTO function of FIG. 19;

FIG. 21, comprising FIGS. 21A, 21B and 21C, are schematic diagram of frames being extracted from three consecutive EL images during a FREEZE function as part of the exemplary method of FIG. 4;

FIG. 27 is a schematic diagram of the UAV during the SCAN function for approximating the center position of the camera's FOV along the PV string in a third part of the MAP function of FIG. 26;

FIG. 28A is a schematic diagram of an exemplary enhanced EL image being mapped onto an exemplary base-map using a string alignment method in a fourth part of the MAP function of FIG. 27; and FIG. 28B is a schematic diagram of an exemplary enhanced EL image being mapped onto an exemplary base-map using a module alignment method as an alternative to the fourth part of FIG. 28A.

DETAILED DESCRIPTION

The following description includes specific examples for illustrative purposes. The person skilled in the art would appreciate that variations and alterations to the specific examples are possible and within the scope of the present disclosure. The figures and the following description of the particular embodiments should not take away from the generality of the preceding summary.

Figure 1:
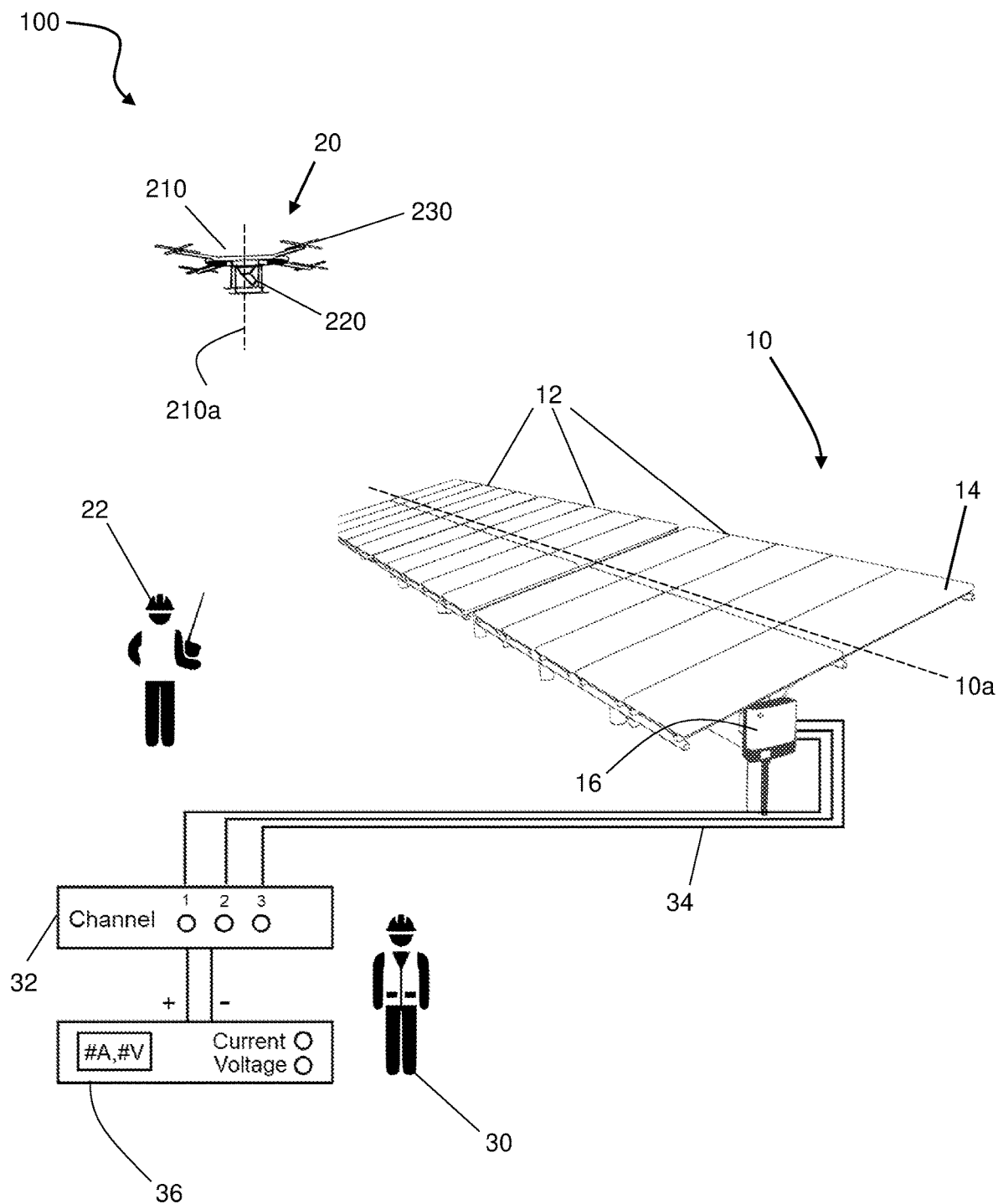
FIG. 1 is an exemplary setup for a UAV to capture EL images of a PV array.

FIG. 1 illustrates an exemplary EL inspection apparatus or setup 100 for capturing EL images of a PV array 10 installed on a roof of a building. In this embodiment, the PV array 10 includes three PV strings 12. Each PV string 12 includes two rows of five PV modules 14. The PV strings 12 are arranged in each row along a longitudinal axis of the PV strings 12 so that the PV array 10 has an array axis 10a that runs along the longitudinal axis of the PV strings 12. The PV strings 12 are connected to a combiner box 16 which combines the PV strings' electrical output. The combiner box 16 is connected to an inverter box (not shown) which is then connected to the power grid. The inverter box converts the combined electrical output from DC to AC before feeding the combined electrical output into the power grid. In this way, electricity generated by the PV modules 14 is fed into the power grid. During EL inspection, the PV array 10 is disconnected from the power grid.

The setup 100 further includes a switcher box 32 that includes three channels 34. Each PV string 12 of the PV array 10 is connected to a respective channel 34 of the switcher box 32. The setup 100 further includes a power supply 36 connected to the switcher box 32. The power supply is configured to supply each PV string 12 with up to 1000 volts of electricity and a minimum current equal to 10% of the short circuit current of the PV modules 14. By selectively activating the channels 34, an on-site worker 30 selectively supplies the PV strings 12 with an electrical current from the power source 36 which puts the PV strings 12 under forward bias conditions. When put in the forward bias condition, one or more PV modules 14 in the PV string 12 emit light, otherwise known as electroluminescence (EL), and thus produce an EL signal that is detected by an optical sub-system of an aerial vehicle (e.g. an unmanned aerial vehicle (UAV) 20).

In FIG. 1, the worker 30 notices that the PV array 10 operating normally is generating less electricity than expected. Neither visual, nor infrared inspection indicated a reason for this. After disconnecting the PV array 10 from the power grid, and electrically connecting the PV array 10 to the power supply 36 via the switcher box 32, the worker instructs an assistant 22 to deploy the UAV 20 to capture EL images of the PV string 12 for EL inspection. The UAV 20 includes a main body 210, a propulsion device 230 attached to the main body 210 to allow the UAV 20 to take flight, and the optical sub-system 220 mounted to the main body 210 for capturing the EL images.

While the assistant 22 is provided in this embodiment, it should be clear that the worker may deploy the UAV 20 without help from the assistant 22. Additionally, it should also be noted that multiple PV strings 12 may be connected to one channel 34. For example, all three PV strings 12 of the PV array 10 may be connected to a single channel 34. In this scenario, all three PV strings 12 are simultaneously put under forward bias conditions, and the EL images of the entire PV array 10 are captured. Notably, the amount of current supplied by the power supply 36 is lower in this scenario compared to when each channel 34 is connected to respective PV strings 12 although this does not affect the PV strings 12 being put under forward bias conditions.

Furthermore, a larger PV array may include multiple combiner boxes 16 which are then connected to the inverter box (not shown). Alternatively, the PV array 10 may not include the combiner box 16, and instead, the PV strings 12 are directly connected to the inverter box.

Preferably, each PV string 12 is supplied with 100% of the short circuit current of the PV modules 14. However, this is not necessary. For example, each PV string 12 may be supplied with a current equal to 60% of the short circuit current of the PV modules 14. A measurement of the same PV array sub section at multiple injection currents may be used to estimate electrical properties of the PV modules 14 and to identify current-dependent defects.

Figure 2:
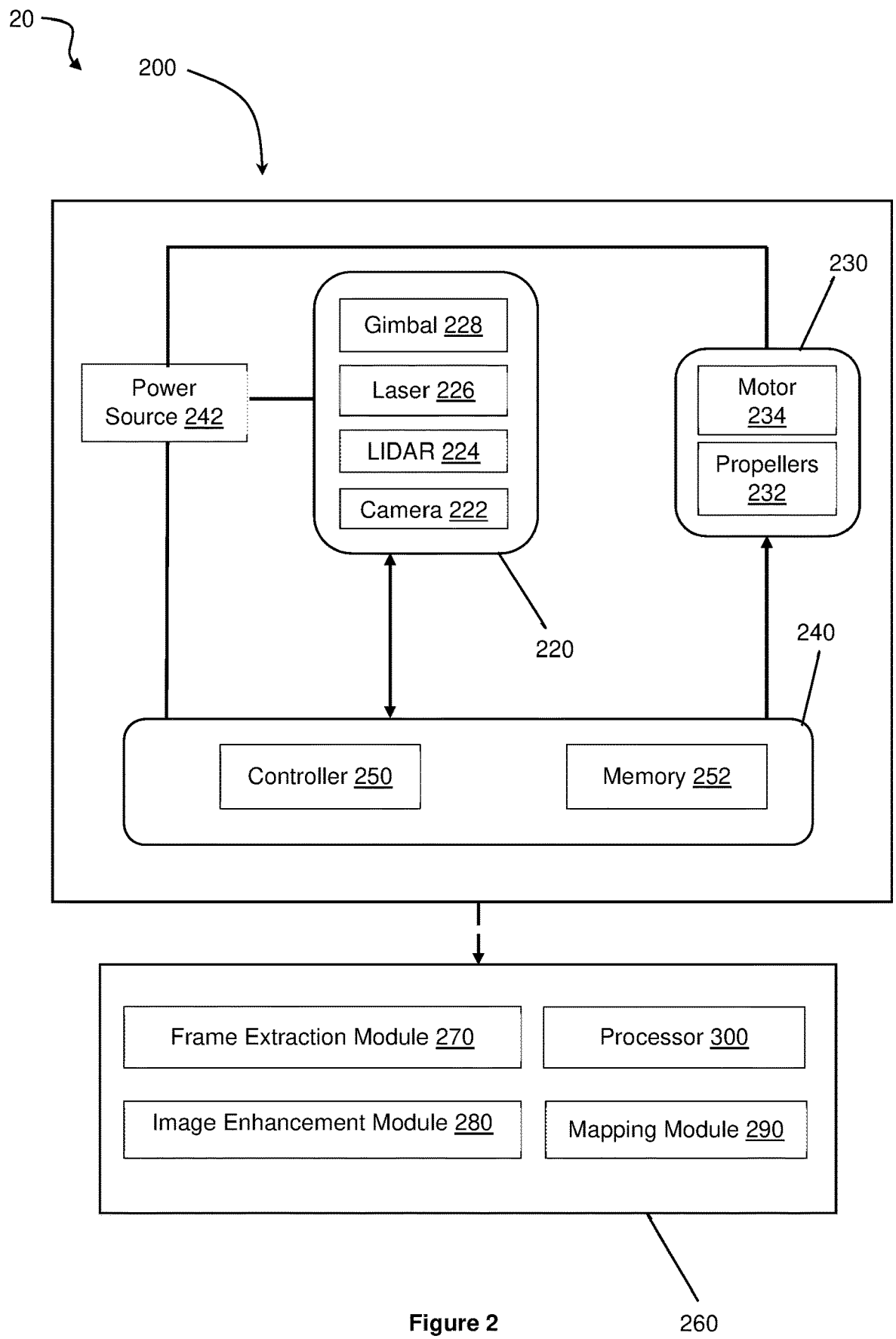
FIG. 2 is a block diagram illustrating a system architecture of a system for capturing and processing EL images, the system including the UAV of FIG. 1.

FIG. 2 illustrates a system architecture of a system 200 of capturing and processing images. The system 200 includes the unmanned aerial vehicle (UAV) 20 and an image processing device 260. In addition to the optical sub-system 220, and the propulsion device 230, the UAV 20 further includes an onboard processing sub-system 240 and a power source 242 (e.g. batteries). The power source 242 is connected to, and powers, the optical sub-system 220, the propulsion device 230, and the onboard processing sub-system 240. The onboard processing sub-system 240 is communicatively coupled to the optical sub-system 220 and the propulsion device 230, and is configured to control the optical sub-system 220 and the propulsion device 230 to perform various functions.

Figure 3:
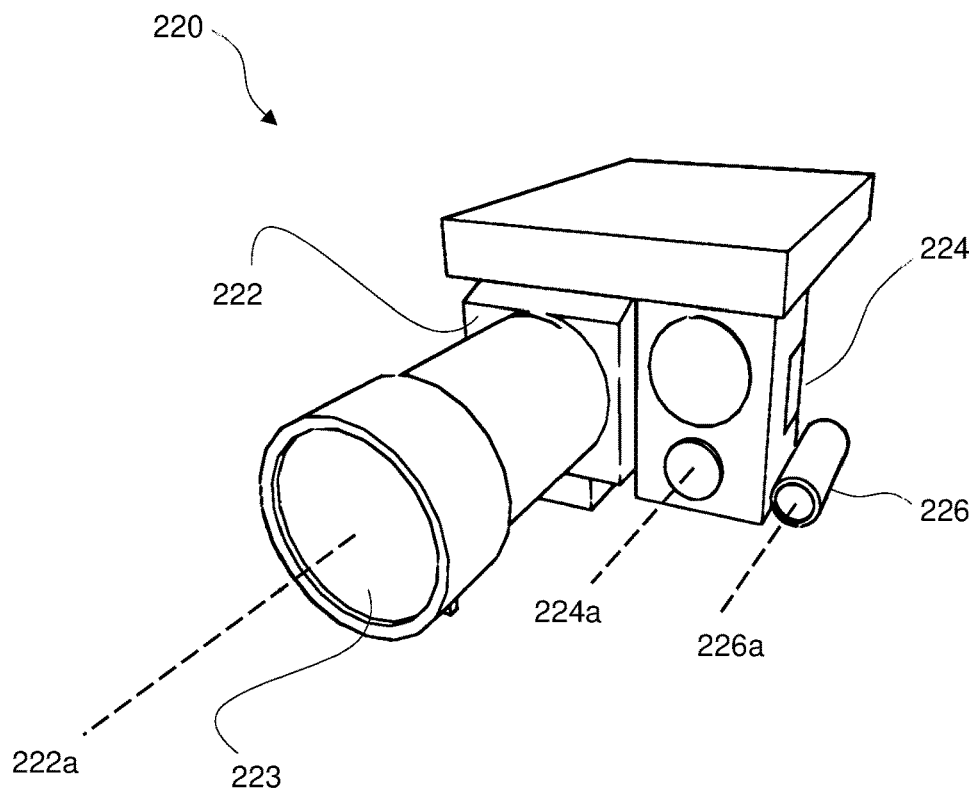
FIG. 3 is an optical sub-system which is a part of the system of FIG. 2.

The optical sub-system 220 is described first with reference to FIG. 3. The optical sub-system 220 includes a camera 222 with an optical axis 222a and in this embodiment, the camera 222 is a video camera operable to take monochromatic video recordings. The camera 222 is sensitive in the near- and/or short-infrared (NIR, SWIR) EL waveband, and is suited for capturing EL images in such wavebands. The camera 222 includes a focusing lens 223 which is also suitable for use in the NIR/SWIR EL waveband. The lens 223 (e.g. motorized focus lens, voltage-controlled polymer lens or liquid lens) allows the onboard processing sub-system 240 to adjust the focus of the lens 223 depending on the distance of the lens 223 to the PV array 10. The camera 222 further includes a lens filter (not shown) for filtering out any unwanted spectrum of light.

The optical sub-system 220 further includes an optical distance measurement device (such as a Light Detection And Ranging device (LIDAR) 224). The LIDAR's optical axis (224a) is aligned to the optical axis 222a of the camera 222. The LIDAR 224 is operable to measure distance of the optical sub-system 220 from the PV array 10.

The optical sub-system 220 further includes a focused light source (such as a laser 226). The laser's optical axis (226a) is also aligned to the optical axis 222a of the camera 222. The laser 226 is arranged to emit light in the visible spectrum, and has a beam divergence that is not larger than the camera's field-of-view (FOV) which minimizes optical interference from the laser. Furthermore, the laser 226 allows for low power operation, emits light in a narrow waveband, and creates focused shapes which are easily identified by the worker 30. The focussed shapes are non-symmetrical which beneficially allows the worker 30 to identify where the camera 222 is pointing at, and also identify a rotation of the camera's FOV.

The optical sub-system 220 further includes a single-axis gimbal 228 (shown in FIG. 2) which attaches the optical sub-system 220 to the main body 210 of the UAV 20.

The onboard processing sub-system 240 controls the gimbal to raise/lower the optical axis 222a of the camera 222 with one degree of freedom (i.e. pitch).

Alternatively, the optical sub-system 220 may be mounted to the main body 210 via a two-axis or a three-axis gimbal to allow for further degrees of freedom (yaw, roll) for adjusting the optical axis 222a of the camera 222 and provide enhanced stability of the FOV. Furthermore, the focused shapes created by the laser 226 may be symmetrical. An LED may also be used in place of the laser 226. The focus of the lens 223 may be adjustable, either mechanically or electrically driven.

Referring to FIG. 2, the propulsion device 230 is described next. The propulsion device 230 includes four sets of propellers 232 driven by respective motors 234 to allow the UAV to take flight and perform aerial maneuvers such as rotating about the aerial vehicle's yaw axis 210a (see FIG. 1). The yaw axis 210a is a vertical axis that runs through a middle portion of the main body 210 when the UAV 20 is upright.

The onboard processing sub-system 240 includes a controller 250 and a memory unit 252. The controller is configured to execute five functions (FOCUS, POINT, FIND, ALIGN, SCAN, AUTO) according to a set of instructions stored in the memory unit 252. The controller 250 receives information from the optical sub-system 220 including the distance from the PV array 10 to the LIDAR 224, as well as the camera's visual feed. Using the information received from the optical sub-system 220, the controller 250 is configured to operate the optical sub-system 220 and the propulsion device 230 to execute the functions POINT, FIND, FOCUS, ALIGN, SCAN and AUTO algorithms. Once the EL images are captured, the UAV 20 returns to its base to transfer the EL images to the image processing device 260 for further processing.

The image processing device 260 is configured to execute the functions FREEZE and MAP. The image processing device 260 includes a frame extraction module 270, an image enhancement module 280, a mapping module 290, and an image processor 300. The image processing device 260 takes the EL images as input, and outputs an enhanced EL image of the PV array 10.

The operation of each component of the aerial vehicle is described in more detail in the following section.

Figure 4:
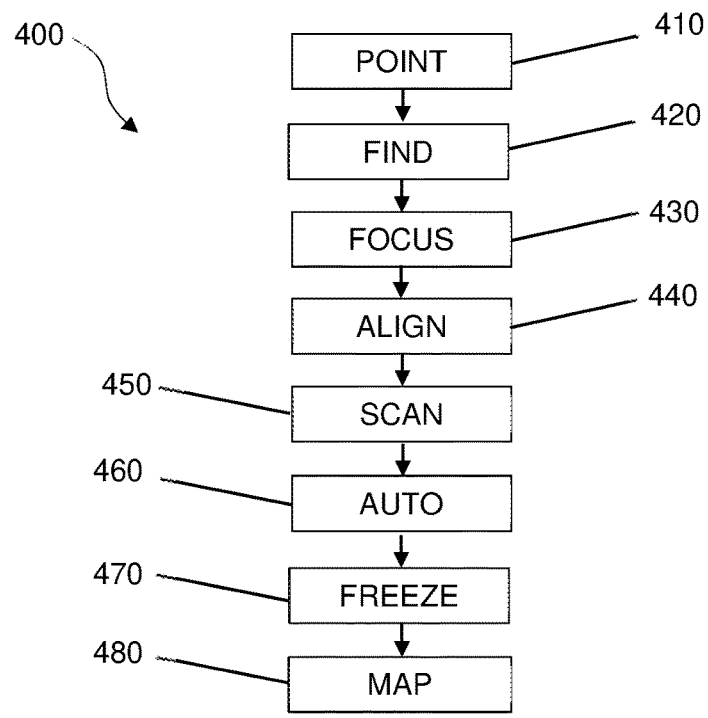
FIG. 4 is a flowchart of an exemplary method for capturing and processing EL images as performed by the system of FIG. 2.
Figure 5:
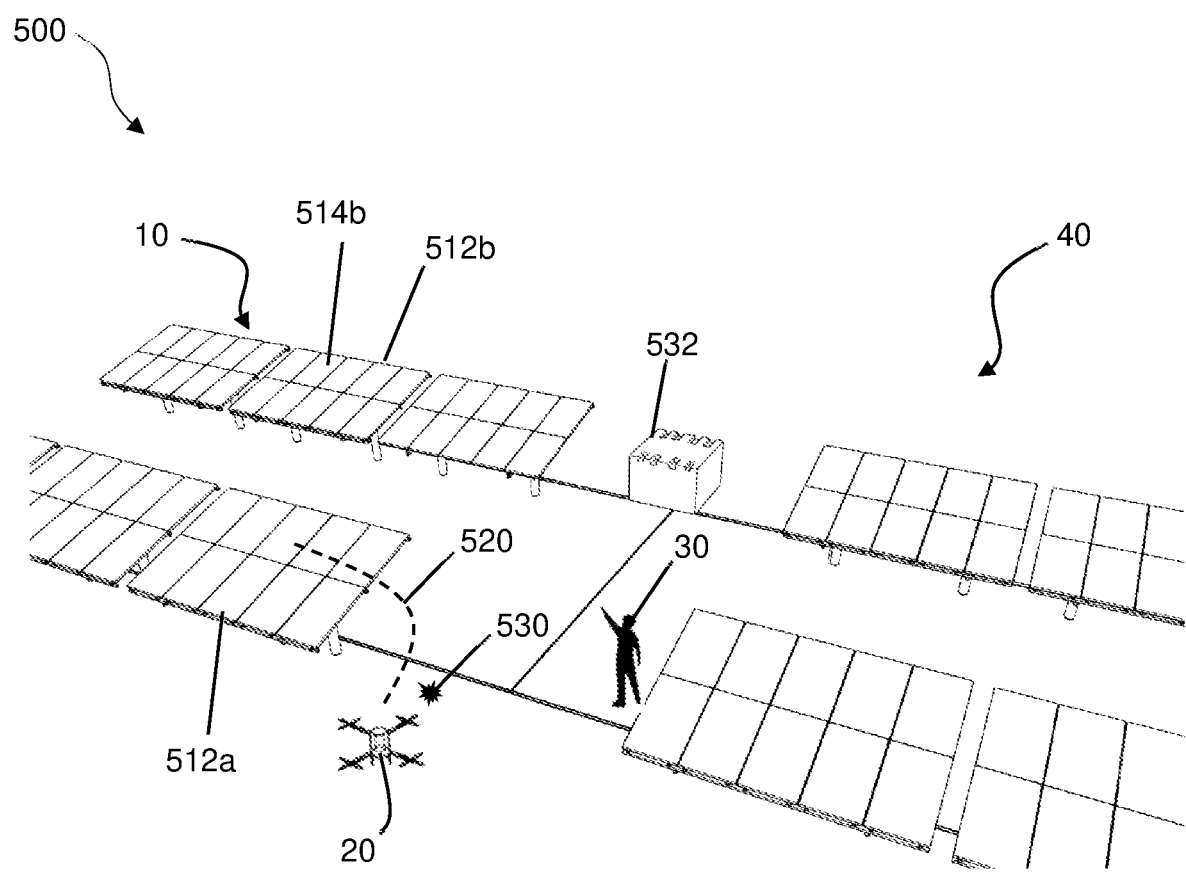
FIG. 5 is a schematic diagram of the UAV performing a POINT function as part of the exemplary method of FIG. 4.

FIG. 4 is a block diagram for an exemplary method 400 of capturing and processing the EL images by the system 200. The exemplary method 400 is described alongside corresponding FIGS. 5 to 26B, where applicable. In this embodiment, the UAV 20 is deployed to perform EL inspection of a PV array 40, preferably performed at night or under low natural light conditions. The PV array 40 is similar to the PV array 10, except the PV array 40 includes more PV modules. The combiner boxes (not shown) of the respective sets from the PV array 10 are connected to a switcher box 532 which is controlled by the onsite worker 30.

At step 410 of the method 400, the controller 250 executes the POINT function. FIG. is a schematic diagram 500 of the UAV 20 performing the POINT function. Upon deployment of the UAV 20, the controller 250 is configured to control the power source 250 to supply power to the laser 226. The worker 30 spots the area 530 illuminated by the laser 226 and identifies where the camera 222 is pointing at. The laser has a light intensity that is within a safe range (laser: Class 1 or 2) so that the onsite worker 30 will not sustain any eye damage even in the event of unintentional direct eye exposure to the laser 226. The laser 226 is switched on throughout most of the operation of the UAV 20. This allows the worker 30 to identify quickly where the camera 222 is pointing at, especially when it is not obvious which PV string is currently under forward bias. The laser 226 is turned off right before the UAV 20 executes the SCAN function so that the laser 226 does not appear in the EL images captured by the camera 222.

The worker 30 consults a string connection schematic which informs the worker 30 which PV string is put under forward bias according to the channel that is activated/open. In this embodiment, the string connection schematic contains an error and the worker 30 is informed that for a particular channel, a PV string 512a is put under forward bias. In actuality, another PV string 512b is put under forward bias, and one or more PV modules 514b of the PV string 512b emits an EL signal. The PV strings 512a, 512b are part of the PV array 40, and is also referred to as a PV array subsection 512a, 512b of the PV array 40.

After activating the particular channel, the worker 30 manually guides the UAV 20 to the PV string 512a along a flight path 520. The worker 30 notices that no EL signal is being emitted by the PV string 512a and deduces that there is an error in the string connection schematic. In order to determine the location of the PV string 512b that is under forward bias i.e. emitting an EL signal, the worker 30 directs the controller 250 to initiate the FIND function.

It should be noted that it is not necessary for the worker 30 to manually guide the UAV to the PV string 512a. The worker 30 may initiate the FIND function immediately after deployment of the UAV 20 thus obviating the POINT function. Alternatively, the controller 250 may also be configured to initiate the FIND function automatically upon deployment of the UAV 20.

Figure 6:
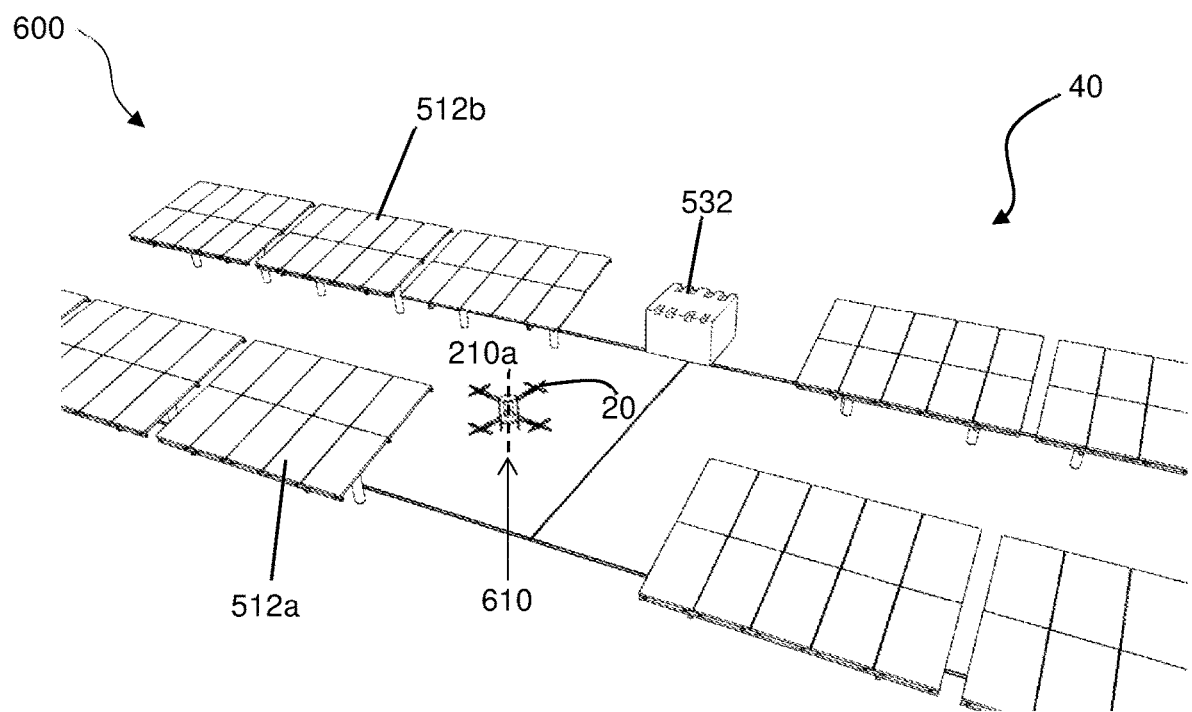
FIG. 6 is a schematic diagram of the UAV performing a first part of a FIND function as part of the exemplary method of FIG. 4.

At step 420 of the method 400, the controller 250 executes the FIND function. FIG. 6 is a schematic diagram 600 of the UAV 20 performing a first part of the FIND function. Notably, the worker 30 and the illuminated area 530 are not illustrated in FIG. 6a (and subsequent figures). The first part of the FIND function involves setting the UAV to an initial position. Upon initiation, the controller 250 is configured to dynamically adjust the propulsion device 220 to maneuver the UAV 20 to the initial position in which the UAV's yaw axis 210a is perpendicular to the ground. The controller 250 is further configured to adjust the gimbal 228 dynamically such that the camera's optical axis 222a is also perpendicular to the ground, or in other words, the camera's field-of-view shows the area directly below the UAV 20. In this position, the optical axis 222a has an angle of 0°.

In addition, the controller 250 is further configured to adjust dynamically the propulsion device 220 to maneuver the UAV 20 (along the UAV's yaw axis 210a) to a predefined elevation 610 from the ground.

Figure 7:
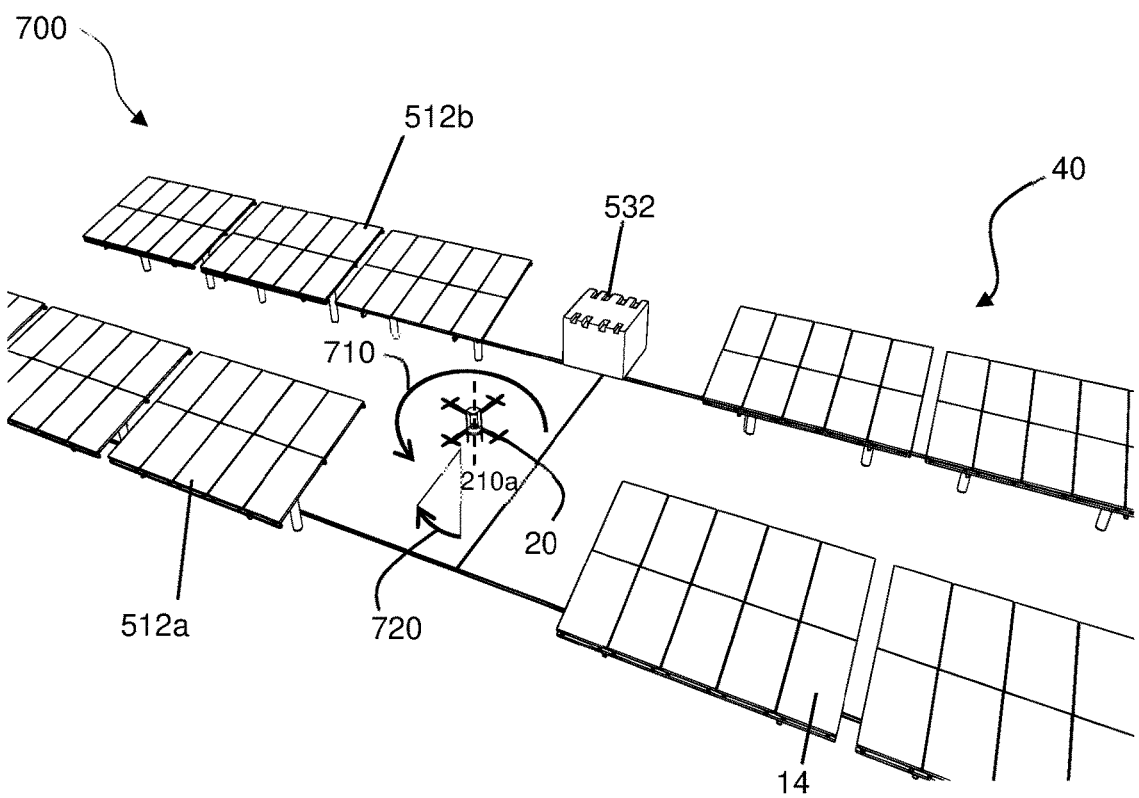
FIG. 7 is a schematic diagram of the UAV performing a second part of the FIND function of FIG. 6.
Figure 8:
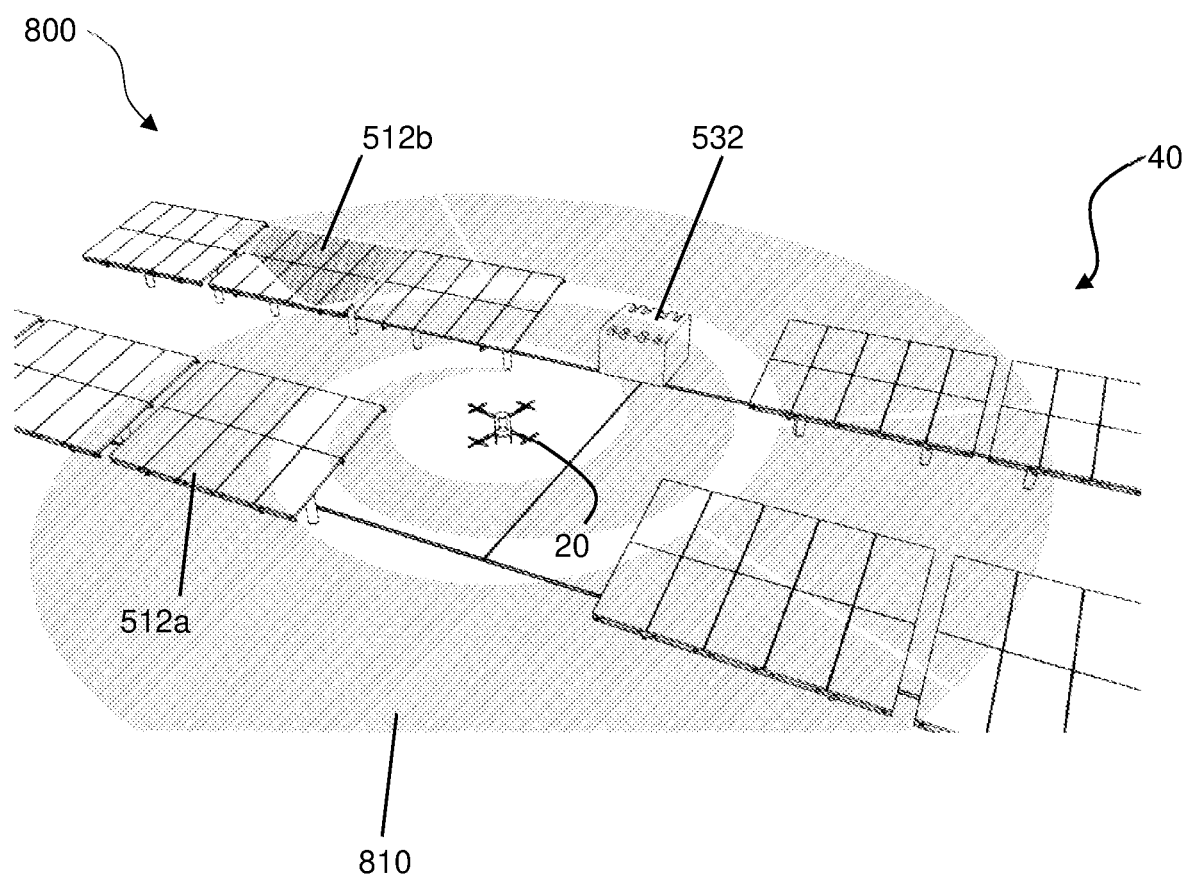
FIG. 8 is a schematic diagram depicting a process and results of the FIND function of FIGS. 6 and 7.

FIG. 7 is a schematic diagram 700 of the UAV 20 performing a second part of the FIND function. The second part of the FIND function involves performing a sweep of the PV array 40 in a sweeping path that starts from the area directly below the UAV and spirals outwards. To perform the sweep, the controller 250 is configured to adjust dynamically the propulsion device 220 to rotate (see arrow 710) the UAV 20 about the UAV's yaw axis 210a. The controller 250 is further configured to simultaneously increase 720 the camera's optical axis angle. This moves the camera's FOV outwards from the UAV 20. In combination with the rotation 720, the camera's scanning path forms a spiral 810. This is illustrated in FIG. 8 which illustrates a schematic diagram 800 depicting the results of the second part of the FIND function.

To give an example, in the initial position, the UAV hovers at a height of 10 m above the ground. If the camera's optical axis angle is moved from 0° to 70°, a radial area of 55 meters is observed (using the law of sines:

$$2 \cdot 10\text{m} \cdot \frac{\sin(50°)}{\sin(20°)} \approx 55\text{m}).$$

The camera 222 has an angle-of-view of 60°. This results in a field of view of 10 m for a view pointing directly towards the ground $$\left(2 \cdot 10\text{m} \cdot \sin\left(\frac{60°}{2}\right) = 10\text{m}\right).$$

Thus, three rotations are sufficient to cover the PV array 40 which has a 25 m radius.

Notably, the camera's optical axis angle is increased at a decreasing pitch speed. From a perspective of the gimbal 228, the gimbal's pitch speed is decreased with increasing pitch angle. Since the scanning path 810 increases with $2\pi$ multiplied by radius, the camera's FOV travels along a five times larger distance ($2\pi \cdot 5$ m $\approx 31$; $2\pi \cdot 25$ m $\approx 157$ m) in its last rotation. In consequence, the camera's rotation 710 or yaw speed is adjusted to be five times lower at the last rotation.

The camera's yaw speed depends on the amount of motion blur that is acceptable in a frame during an exposure time. For a maximum deflection during exposure of 10 pixels, an exposure time of 7 ms and a horizontal sensor resolution of 640 px, a yaw speed of 22 m/s is possible $$\left(\frac{\frac{10px}{7ms}}{640px} * 10\text{m} \approx 22\text{m/s}\right).$$

With an approximated travelled distance for the whole spiral of 282 m (sum of three circles at 5 m, 15 m, 25 m radius) the method FIND may take at maximum 13 seconds if no PV string under forward bias is detected. While the function FIND is in progress, the controller 250 checks the images captured by the camera 222 for features of the forward biased PV string 512b. The function FIND stops when an EL signal is detected from PV string 512b. Upon EL detection, the controller 250 is configured to adjust dynamically the propulsion device 220 to maneuver the UAV 20 to the EL signal. In this way, the EL signal is being used as an optical marker to guide the UAV 20.

At step 430 of the method 400, the controller 250 executes the FOCUS function. The controller 250 receives information regarding the distance of the camera 222 to the one or more PV modules in the PV string 512b from the LIDAR 224. The controller 250 is configured to adjust dynamically the camera's focus to match the distance between the camera lens 223 and a focal point to the distance between the camera lens 223 and imaged object according to the measured distance to maintain the camera lens' focus.

Figure 9:
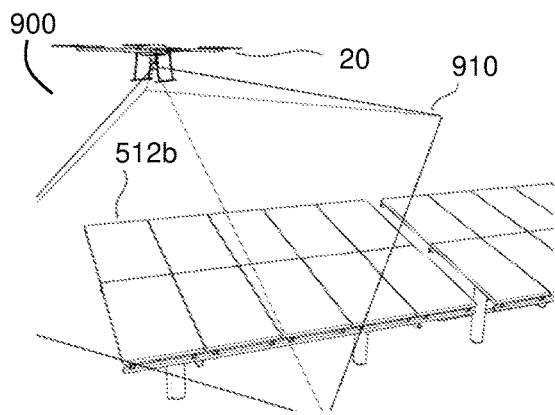
FIG. 9 is a perspective view of the UAV hovering over a PV string with the camera's FOV misaligned before an ALIGN function is performed as part of the exemplary method of FIG. 4.
Figure 10:
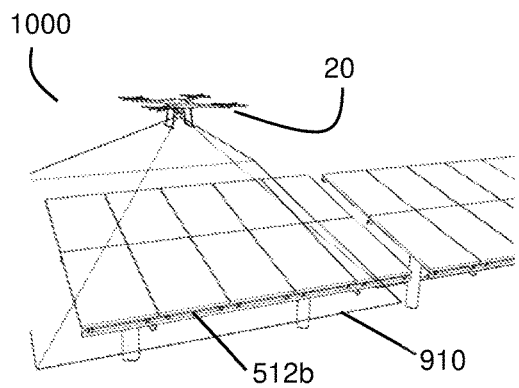
FIG. 10 is a perspective view of the UAV hovering over a PV string with the camera's FOV aligned after an ALIGN function is performed as part of the exemplary method of FIG. 4.
Figure 11:
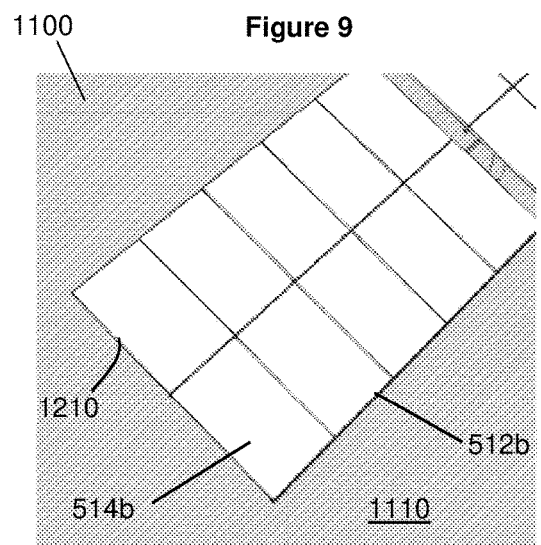
FIG. 11 is an EL image from the perspective of the camera with the camera's FOV misaligned according to FIG. 9.
Figure 12:
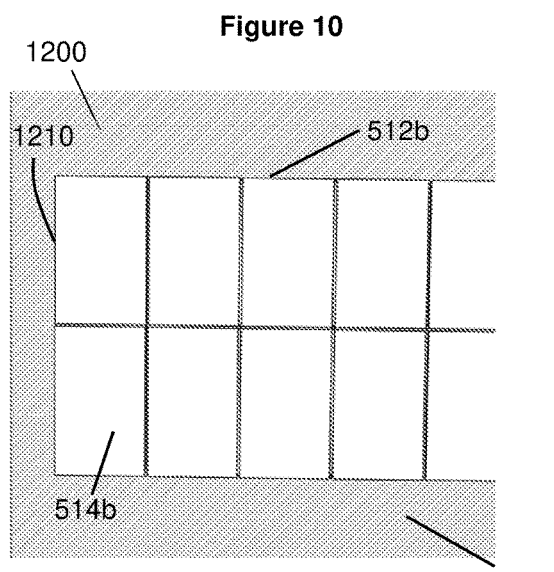
FIG. 12 is an EL image from the perspective of the camera with the camera's FOV aligned according to FIG. 10.
Figure 13:
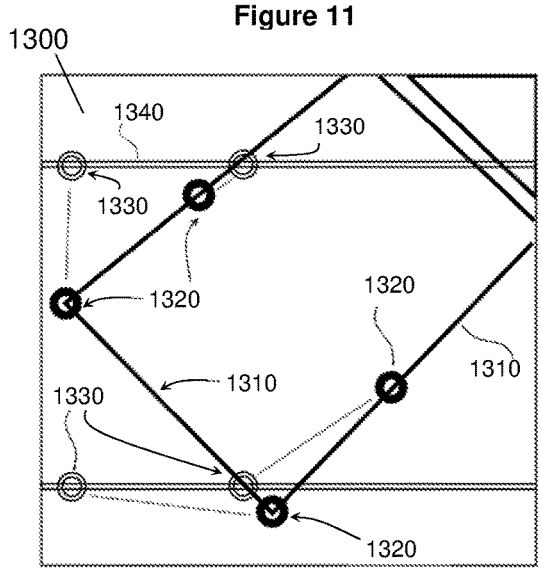
FIG. 13 is a schematic diagram of the EL image from the perspective of the controller with the camera's FOV misaligned according to FIG. 11.
Figure 14:
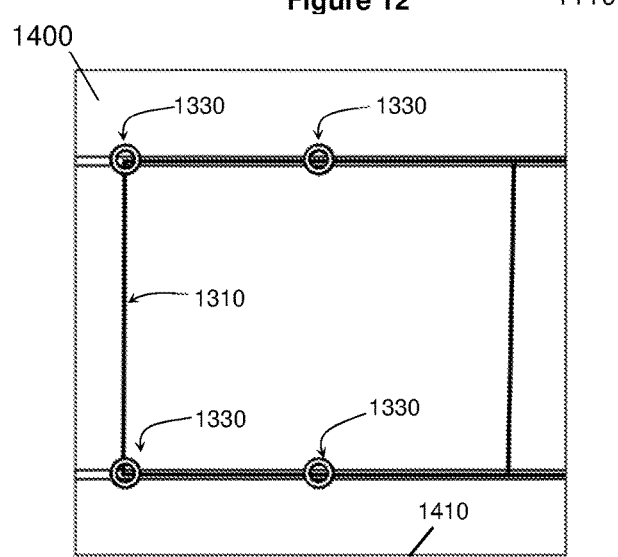
FIG. 14 is a schematic diagram of the EL image from the perspective of the controller with the camera's FOV aligned according to FIG. 12.

At step 440 of the method 400, the controller 250 executes the ALIGN function which is described next in relation to FIGS. 9 to 14. FIGS. 9 and 10 are perspective views 900, 1000 of the UAV 20 hovering over the PV string 512b with the camera's FOV misaligned and aligned to the PV string 512b respectively. FIGS. 11 and 12 are EL images 1100, 1200 from the perspective of the camera 222 with the camera's FOV misaligned and aligned respectively. FIGS. 13 and 14 are schematic diagrams 1300, 1400 of the EL images 1100, 1200 from the perspective of the controller 250.

Referring to FIG. 9, the camera's FOV 910 is misaligned relative to the PV string 512b. The camera's FOV 910 has to be aligned to the PV string 512b (as depicted in FIG. 10), before the method 400 can proceed to the SCAN function.

The controller 250 receives an EL image 1100 from the camera 222 (as depicted in FIG. 11). The EL image 1100 includes the PV string 512b (or a portion of the PV string 512b) which appears bright (higher light intensity) due to the EL signal emitted by the one or more PV modules 514b, compared to the background 1110 i.e. the ground. The controller 250 applies an algorithm to determine that the camera's FOV 910 is misaligned relative to the PV string 512b. The algorithm utilizes an intensity difference between the bright PV string 512b and the dark background 1110 to detect a position and orientation of the PV string 512b (or of a reference PV module 514b). Specifically, and with reference to FIG. 13, the algorithm detects the PV string's edges 1310, and derive key points 1320 (e.g. module corner points) from the edges 1310. The algorithm then determines a set of aligned points 1330 corresponding to each key point 1320 which minimizes the misalignment and any angular or perspective distortions. The aligned points 1330 are set on upper and lower horizontal indicators 1340.

Further, the algorithm also determines an appropriate elevation of the UAV 20 relative to the PV string 512b which puts the PV string 512b at a predefined size ratio within the camera's FOV 910. The predefined size ratio is set to keep a space of about 5-10% between the top and bottom of the PV string 512b and image border 1410 to allow a tolerance to positional oscillations of the UAV 20. In other words, the PV string 512b occupies 80% to 90% of the camera's FOV at the predefined size ratio.

The algorithm then determines a perspective transformation to align the key points 1320 to the aligned points 1330 (as depicted in FIG. 14). The controller 250 is then configured to make appropriate adjustments to the gimbal 228 and the propulsion device 220 based on the perspective transformation. As can be seen in FIG. 14, the camera's FOV 910 is aligned to the PV string 512b, and the PV string 512b is at the predefined size ratio within the camera's FOV 910. Once aligned, the camera's optical axis is perpendicular to the PV string's planar surface. Since the PV string includes one or more PV modules 514b, the PV string's planar surface is made up of the one or more PV modules' planar surface. The one or more PV modules' planar surface is defined as the surface that is arranged to receive the sunlight.

Notably, the controller 250 is configured to execute the ALIGN function repeated while the SCAN function is in progress. This ensures that the camera's optical axis is perpendicular to the PV string's planar surface while the EL images are being captured during the SCAN function. Advantageously, this minimizes perspective distortion and increases the image resolution of EL images captured by the camera 222. Further, this allows the camera 222 to capture EL images with a more consistent focus across the EL image. In addition, the EL intensity from each PV module 514b is captured accurately which is important for analysis purposes.

Notably, if the controller 250 does not detect an end 1210 of the PV string 512b in the EL image 1200, the controller 250 is configured to adjust the propulsion device 220 to maneuver the UAV 20 along the PV string's longitudinal axis 10a (refer to FIG. 1) until the end 1210 of the PV string 512b is in the EL image 1200.

Figure 15:
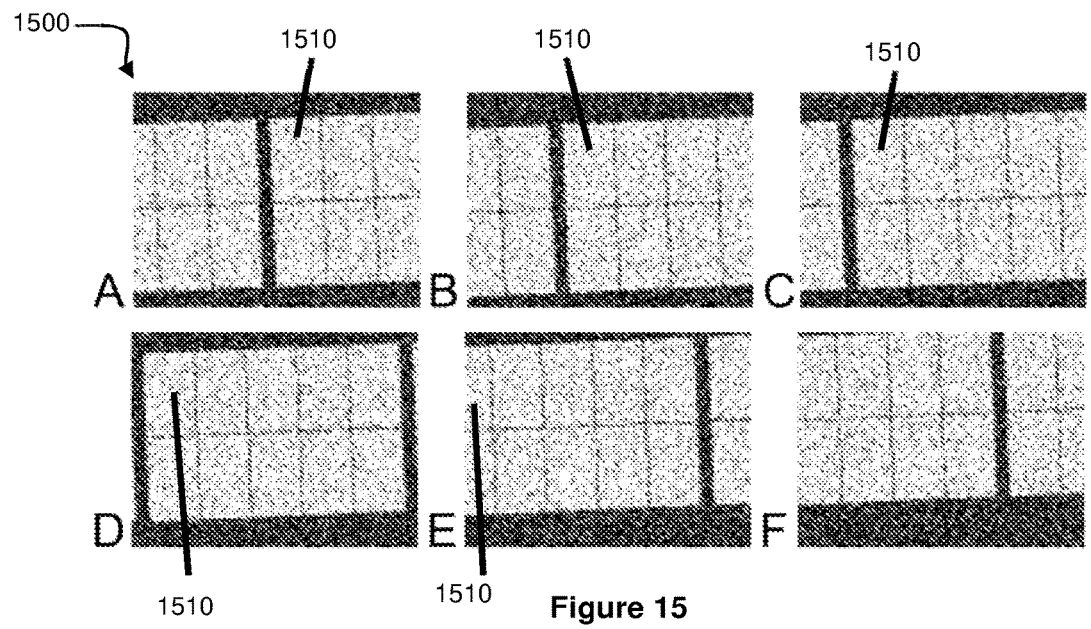
FIG. 15, comprising

At step 450, the controller 250 executes the SCAN function which is described next alongside FIGS. 15 to 17. FIG. 15 includes FIGS. 15A to 15F which respectively illustrate a series 1500 of six consecutive EL frames of the PV string 512b captured by the camera 222 at different positions along the PV string 512b. Notably, the EL frames overlap so that a PV module 1510 is likely to appear more than once, i.e. in FIGS. 15A to 15E.

When considering large PV installations and a limited flight time of the UAV 20, scanning speed becomes a crucial parameter in determining system efficiency. Long camera exposure times typically result in better image quality, i.e. better signal-to-noise ratio (SNR). However, a long camera exposure time coupled with a fast scanning speed causes motion blur which reduces the image quality. On the other hand, a short camera exposure time results in EL images with too much noise, especially when the injected current is low, which also reduces image quality.

Since the PV module 1510 appears in FIGS. 15A-15F, there are five frames of the PV module 1510 (which will be extracted at a later stage) available for image averaging (again at a later stage). The SNR of an image average 1520 increases roughly with the square root of the number of frames available for image averaging ($n_{frames}$). In other words, image noise of the image average 1520 reduces with the number of frames used to create the image average. The number of frames available for image averaging is calculated in real-time by the controller 250 since it also dependent on the scanning speed.

Furthermore, even with the ALIGN function being executed repeatedly during the SCAN function, it is difficult for the camera's FOV to remain completely stable throughout the SCAN function. This is especially so considering the positional oscillations of the UAV 20 due to external forces (such as wind) acting on the UAV 20.

Figure 16:
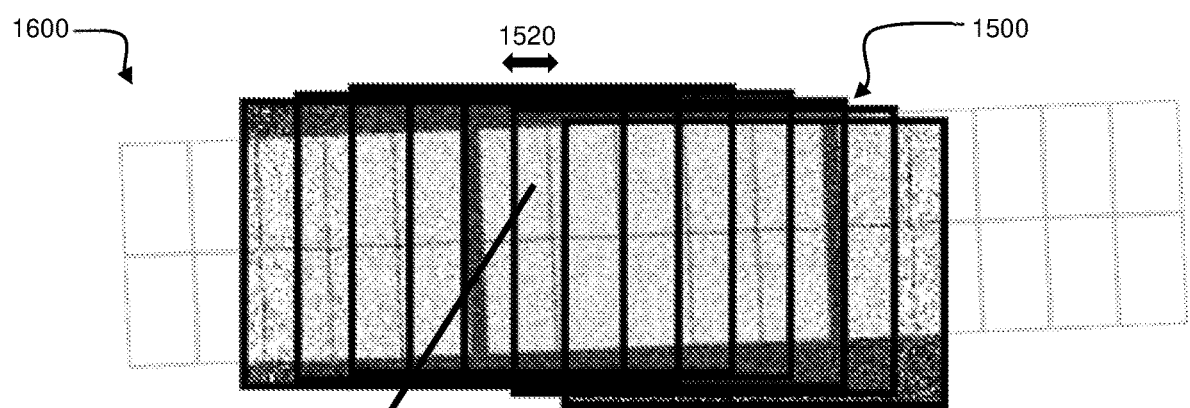
FIG. 16 is a schematic diagram of the series of EL images of FIG. 15 after image alignment to the PV string is performed.

This is evident in FIG. 16 which is a schematic diagram of the series 1500 after image alignment of the EL images in FIGS. 15A-15F to the PV string 512b is performed. The positional oscillation of the UAV 20 is evident in a point-to-point deflection between EL images along the PV string 512b. While the positional oscillations are mitigated (and mostly corrected) by the ALIGN function, any computation of the scanning speed has to take into consideration this deflection, along with limiting noise and motion blur.

Limiting Noise:

The controller 250 is configured to perform optical flow analysis (e.g. Lucas-Kanade method) during the SCAN function. For each frame in FIGS. 15A-15F that is captured by the camera 222, the controller 250 calculates key points in a current frame, and compares the key points in the current frame with the key points in a preceding frame to determine a length of a deflection vector.

Figure 17:
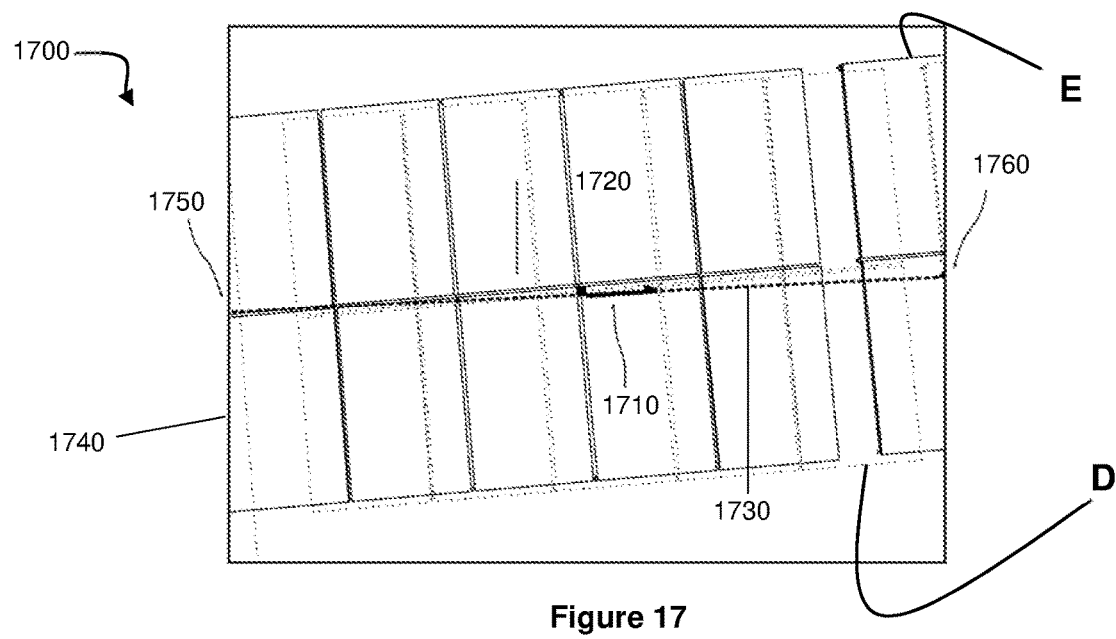
FIG. 17 is a schematic diagram of two consecutive EL images from FIG. 15 showing point-to-point deflection.

FIG. 17 is a schematic diagram 1700 of two consecutive EL images (i.e. FIGS. 15D and 15E) of the PV string 512b showing point-to-point deflection. The preceding EL image of FIG. 15E is shown in dotted lines while the current EL image F is shown in bold lines. The deflection of an object 1710 in an image centre 1720 is calculated from an average deflection of detected key points in the EL images of FIGS. 15D and 15E. The length of this deflection vector is referred to as $d_{f2f}$.

The controller 250 calculates a line 1730 through the image centre 1720 and at deflection angle. The line 1730 intersects the image border 1740 at intersection points 1750, 1760. The distance between the intersection points 1750, 1760 represents an object distance travelled through the image plane. The controller 250 then calculates $n_{frames}$ by taking the ratio of the length of the deflection vector $d_{f2f}$ to the distance between the intersection points 1750, 1760.

The impact of noise on the image quality can be quantified with the SNR:

$$SNR = \frac{Signal}{Noise} \qquad (1)$$

In this embodiment, the SNR is calculated in the following manner. The captured Otsu's method is used to obtain a threshold ($to_{tsu}$) between the dark background 1110 and the PV string 512b (or a portion of the PV string 512b) which appears brighter due to the EL signal emitted by the one or more PV modules 514b. The 'Signal' value is obtained by averaging the intensity of all pixels brighter than the threshold, $to_{tsu}$. The 'Noise' value is obtained before EL measurement from an average of the standard deviation of a pixel of multiple images taken with similar or comparable imaging parameters (e.g. exposure time, sensor temperature and gain) in series.

An SNR-dependent scanning speed factor (or simply SNR scanning factor), $f_{SNR}$ is applied on the current scanning speed to ensure that the SNR of the image average 1520, $SNR_{frame}$ matches a target SNR, $SNR_{target}$ using Equation (2)

$$f_{SNR} = \frac{SNR_{frame} \circ \sqrt{n_{frames}}}{SNR_{target}} \quad (2)$$

For example, $SNR_{target}$ is set at 45 for lab measurements. The camera exposure time is adjusted during the SCAN function to keep the $SNR_{frame}$ at 5 (minimum requirement for outdoor measurements). The controller 250 then estimates that twenty-five EL images are available for image averaging ($n_{frame}$=25). Based on Equation (1), $$f_{SNR} = \frac{5 \cdot \sqrt{25}}{45} = \frac{25}{45} \approx 56\%.$$

In other words, the current scanning speed should be reduced to 56% of its current value. In essence, lowering the scanning speed increases the number of frames ($n_{frames}$) available for creating the image average 1520.

Limiting Motion Blur:

To avoid effects of motion blur, object deflection during exposure of a frame ($d_{exp}$) should also be below a predetermined maximum value ($d_{exp\_max}$). A value of 0.75 pixel per exposure time is suggested. The frame to frame deflection ($d_{f2f}$) can be scaled into exposure time deflection ($d_{exp}$) using the time difference between two frames ($t_{f2f}$) and exposure time ($t_{exp}$) according to Equation (3).

$$d_{exp} = d_{f2f} \cdot \frac{t_{f2f}}{t_{exp}} \quad (3)$$

A motion blur dependent scanning factor ($f_{blur}$) is equal to a ratio of the maximum object deflection $d_{exp\_max}$ to the current object deflection $d_{exp}$ as shown in Equation (4).

$$f_{blur} = \frac{d_{exp\_max}}{d_{exp}} \quad (4)$$

A scanning speed factor ($f_{scan}$) is obtained from a minimum of both factors ($f_{SNR}$, $f_{blur}$) as shown in Equation (5):

$$f_{scan} = \min(f_{SNR}, f_{blur}) \quad (5)$$

To ensure high EL image quality, a maximum set scanning speed, $v_{quality}$ is obtained using Equation (6):

$$v_{quality} = \min(v_{max}, f_{scan} * v_{cur}) \quad (6)$$

The maximum set scanning speed, $v_{quality}$ defines the maximum scanning speed at which a high EL image quality can still be achieved.

According to Equation (6), a target scanning speed is calculated by multiplying the scanning speed factor, $f_{scan}$ with the current flight speed, $v_{cur}$. If the target scanning speed is below a maximum flight speed, $v_{max}$ of the UAV 20, then the target scanning speed is selected as the maximum set scanning speed, $v_{quality}$. In other words, even though the UAV 20 is able to move faster up to its maximum flight speed, $v_{max}$, since this reduces the image quality of the EL images, the maximum set scanning speed, $v_{quality}$ is set below the maximum flight speed $v_{max}$.

If the maximum set scanning speed exceeds the maximum flight speed, $v_{max}$ of the UAV 20, then the maximum flight speed, $v_{max}$ is selected as the maximum set scanning speed, $v_{quality}$.

The target flight speed, $v_{target}$ is obtained from the maximum set scanning speed, $v_{quality}$, and a user input factor, $f_{user}$ according to Equation (7).

$$v_{target} = v_{quality} \cdot f_{user} \quad (7)$$

The user input factor, $f_{user}$ is obtained from a deflection of a joystick controlled by the worker 30 remotely, and ranges from 0% to 100%. At 100%, the target flight speed, $v_{target}$ is simply the maximum set scanning speed, $v_{quality}$.

A smoothing technique is applied to the target flight speed, $v_{target}$ to minimise jerky movement of the UAV 20. In this embodiment, exponential moving average is used to obtain a set speed, $v_{set}$ according to Equation (8). $\alpha$ is a smoothness factor within a range of 0 to 100%.

$$v_{set} = (\alpha \cdot v_{cur}) + ((1-\alpha) \cdot v_{target}) \quad (8)$$

Two exemplary embodiments of the SCAN function are described next with reference to FIGS. 18A and 18B which are line graphs 1800a, 1800b showing the current flight speed, $v_{cur}$ of the UAV 20 decreasing and increasing respectively over time in accordance with the SCAN function. For both embodiments, the user input factor, $f_{user}$ is taken to be 100%, and the maximum flight speed, $v_{max}$ of the UAV 20 is taken to be 9 m/s.

Figure 18A:
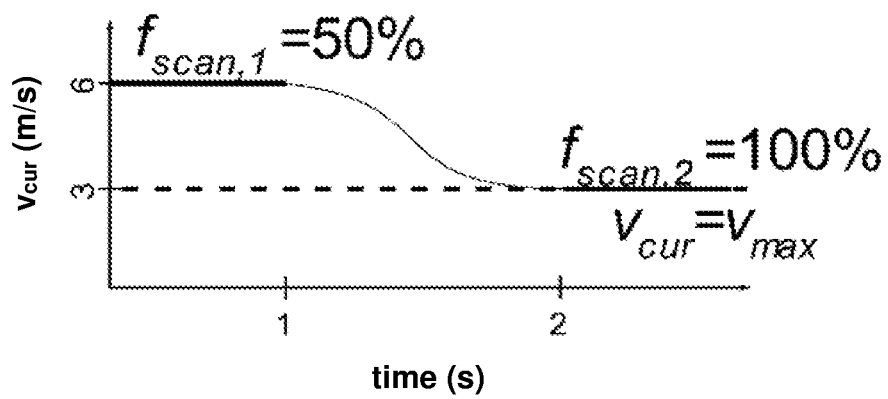
FIG. 18A is a line graph showing a current flight speed of the UAV decreasing over time while performing the SCAN function as part of the exemplary method of FIG. 4.

Referring to FIG. 18A, at time=1 s, and with the UAV 20 moving at a current flight speed, $v_{cur}$ of 6 m/s, the controller 250 obtains a scanning speed factor, $f_{scan1}$ of 50% from Equation (5). If the scanning speed factor is below 100%, this indicates that the UAV 20 is moving faster than the UAV 20 should. The controller 250 then determines the target scanning speed to be 3 m/s. Since the target scanning speed is below the maximum flight speed, $v_{max}$ of the UAV 20, the target scanning speed is selected as the maximum set scanning speed, $v_{quality}$ according to Equation (6).

Notably, since the user input factor, $f_{user}$ is 100%, the maximum set scanning speed, $v_{quality}$ is also the target flight speed, $v_{target}$ according to Equation (7).

The controller 250 then dynamically decreases the current flight speed of the aerial vehicle until the target flight speed, $v_{target}$ is achieved. The smoothing technique according to Equation (8) is applied to minimise the jerky movement of the UAV 20, and this can be seen in the smooth transition of the current flight speed, $v_{cur}$ of the UAV 20 from 6 m/s (at time=1 s) to 3 m/s (at time=2 s).

At time=2 s, the controller 250 obtains a scanning speed factor, $f_{scan2}$ of 100% from Equation (5). At this point, the current flight speed, $v_{cur}$ of the UAV 20 matches the maximum set scanning speed, $v_{quality}$.

Figure 18B:
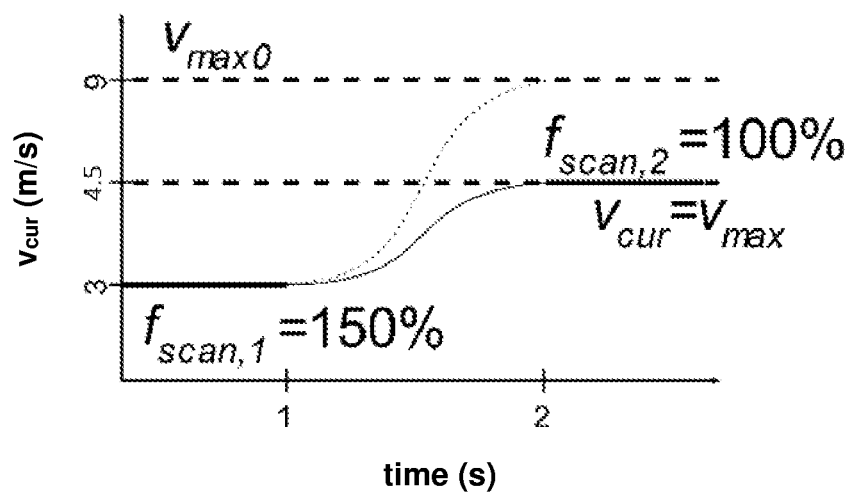
FIG. 18B is a line graph showing a current flight speed of the UAV increasing over time while performing the SCAN function as part of the exemplary method of FIG. 4.

Referring to FIG. 18b, at time=1 s, and with the UAV 20 moving at a current flight speed, $v_{cur}$ of 3 m/s, the controller 250 obtains a scanning speed factor, $f_{scan1}$ of 150% from Equation (5). If the scanning speed factor is above 100%, this indicates that the UAV 20 can move 50% faster while still matching the image quality that is required. The controller 250 then determines the target scanning speed to be 4.5 m/s.

Since the target scanning speed is below the maximum flight speed, $v_{max}$ of the UAV 20, instead of selecting the maximum flight speed, $v_{max}$ as the maximum set scanning speed, $v_{qualrty}$, the target scanning speed is selected as the maximum set scanning speed, $v_{quality}$ according to Equation (6).

Similarly, since the user input factor, $f_{user}$ is 100%, the maximum set scanning speed, $v_{quality}$ is also the target flight speed, $v_{target}$ according to Equation (7). The smoothing technique according to Equation (8) is also applied to minimise the jerky movement of the UAV 20.

The controller 250 then dynamically increases the current flight speed, $v_{cur}$ of the aerial vehicle until the target flight speed, $v_{target}$ is achieved. At time=2 s, the controller 250 obtains a scanning speed factor, $f_{scan2}$ of 100% from Equation (5). At this point, the current flight speed, $v_{cur}$ of the UAV 20 matches the maximum set scanning speed, $v_{quality}$.

Notably, the controller 250 continuously performs the SCAN function until an opposing end of the PV string 512*b* is detected. Once the opposing end of the PV string 512*b* is detected, the controller 250 terminates the SCAN function and the EL images are stored in the memory unit 252.

Figure 19:
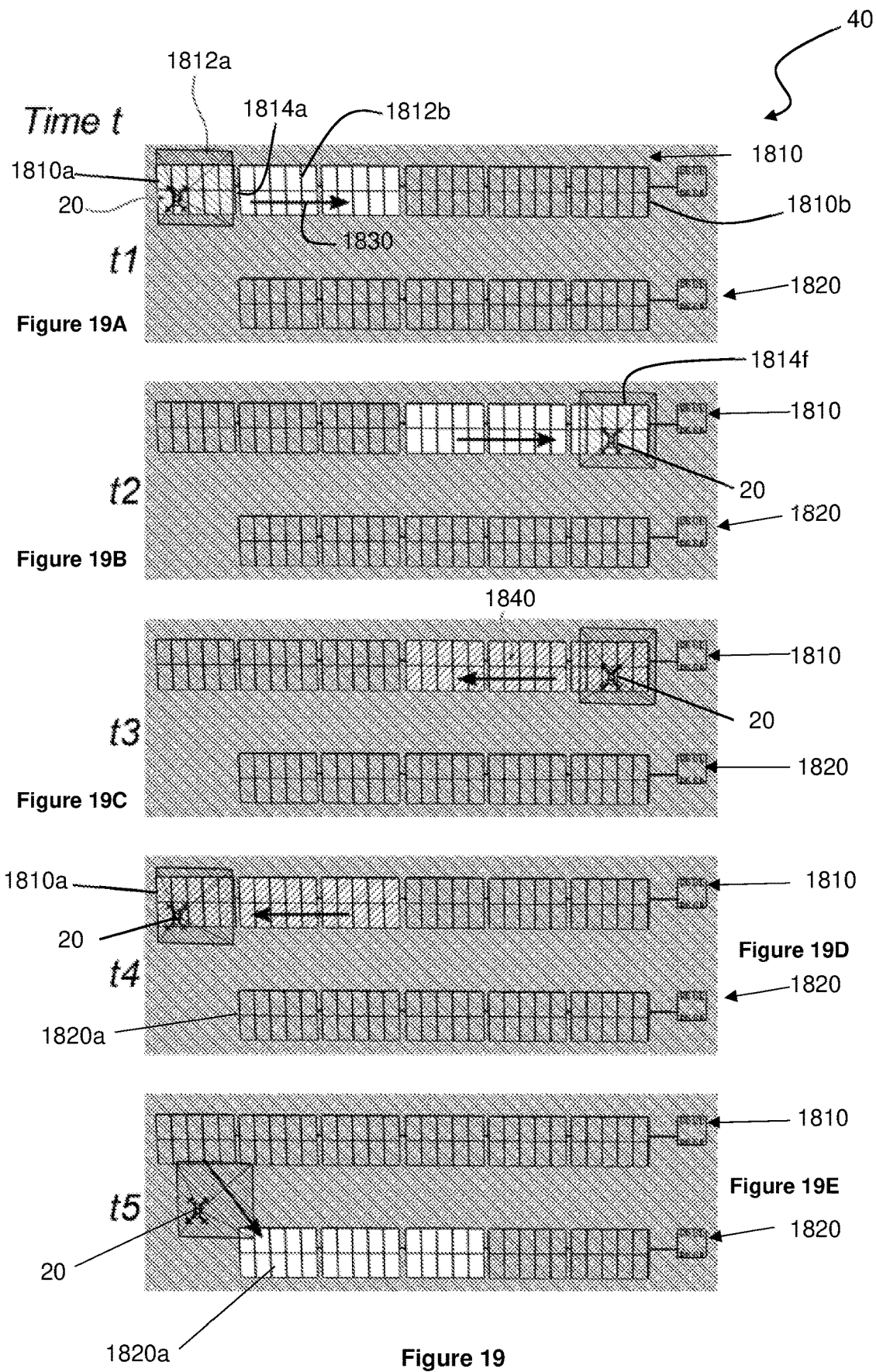
FIG. 19 comprising

At step 460, the controller 250 is configured to execute the AUTO function. FIG. 19, which includes FIGS. 19A to 19E, is a schematic diagram showing a time lapse of the UAV 20 capturing EL video images of the PV array 40 (using the PV array 40 of FIG. 5 as an example). The PV array 40 is illustrated to include two rows 1810, 1820 of PV strings. The controller 250 is communicatively coupled to and is able to control the power supply 36 and the switcher box 532 (via a wireless connection) which in turn is electrically connected to the PV array 40.

At t1, as illustrated in FIG. 19A, the UAV 20 starts at an end 1810*a* of the first row 1810 and captures the EL images of the first PV string 1812*a* in a scanning direction 1830. Upon detecting an end 1814*a* of the PV string 1812*a*, the controller 250 is configured to instruct the switcher box 532 to close the current channel, and open the next channel for the next PV string, 1812*b*. Notably, the current injected into the PV string 1812*b* is maintained at a same level as the PV string 1812*a*. The process continues until the controller 250 detects that it has reached the last PV string 1812*f* at an opposing end 1810*b* of the first row 1810 of PV strings at t2 as shown in FIG. 19B.

At t3, as illustrated in FIG. 19C, the controller 250 is configured to instruct the power supply 36 to lower the current injected into the PV string 1812*f*. The purpose of lowering the injection current is to capture low-current EL images for comparison with the higher current EL images. The controller 250 then dynamically adjusts the propulsion device 220 to move the UAV 20 in a scanning direction 1840, which is opposite to the scanning direction 1830. The UAV 20 moves along the scanning direction 1840 and captures the EL images of the PV strings in the first row 1810 at a lower injection current.

FIG. 19D illustrates that at t4, the controller 250 detects that the UAV 40 has reached the end 1810*a* of the first row 1810 of PV strings. At this point, the controller 250 is configured to instruct the switcher box 532 to close the current channel and open the next channel to put the first PV string 1820*a* of the second row 1820 under forward bias. The controller 250 is further configured to execute the FIND function to locate the EL signal emitted by the PV string 1820*a*. Notably, the PV string 1820*a* is within the camera's FOV during the FIND function, and the controller. 250 is able to locate the PV string 1820*a*.

At t5 in FIG. 19E, the controller 250 is configured to navigate the UAV 20 to the PV string 1820*a*. Once the UAV 20 has reached the PV string 1820*a*, the controller 250 is configured to execute the SCAN function once again. The EL images of the PV strings in the second row 1820 are captured using a similar process used to capture the EL images of the PV strings in the first row 1810 (as detailed in t1 to t4). Notably, the controller 250 is configured to execute the ALIGN function throughout the duration of the SCAN function. The captured EL images are stored in the memory unit 252.

FIG. 20 is a schematic diagram 1900 of a file structure for the stored EL images. The file structure includes the stored EL images 1910, and an appended block including additional meta data 1920. The meta data 1920 is separated into a header 1930 and a body 1940. The header 1922 includes information on the image correction methods applied on the EL images 1910 before the EL images 1910 are saved. The image correction methods include dark current subtraction, flat filed correction, bad pixel substitution, and lens distortion removal. The body 1924 stores image-dependent data which include camera exposure time and gain, UAV geo-location, camera orientation (yaw, pitch, roll), injection current, voltage, and channel information.

The camera 222 captures/digitizes the EL images 1910 at a bit depth larger than 8-bit (e.g. 14- or 16-bit). This allows resolving an image intensity range more precisely than within the 255 brightness steps of a monochromatic 8-bit sensor. To reduce the file size, an image encoder based on 8-bit images is used. An upper and lower intensity range of each EL image 1910 is stored in the meta data 1920. The upper and lower intensity range is obtained from the effective dynamic range of each EL image 1910 captured by camera 222. The range can be used to scale every 8-bit. EL image to respective lower and upper intensity range of the original higher depth camera image.

Once the UAV 20 returns to its base, the stored EL images are then transferred to the image processing device 260 for further processing.

At step 470, the image processing device 260 executes the FREEZE function which is described next with reference to FIGS. 21 to 24. For the sake of brevity, the FREEZE function is described with reference to processing the EL images that include the PV string 512*b* only. It should be understood that the FREEZE function may process every EL image in a similar manner.

The FREEZE function includes (i) a frame extraction step performed by the frame extraction module 270; and (ii) an image enhancement step performed by the image enhancement module 280.

FIG. 21 includes FIGS. 21A to 21C which respectively illustrates three consecutive EL frame images 2000*a*, 2000*b*, 2000*c* of the PV string 512*b* being processed as part of the frame extraction step. The image processor 300 instructs the frame extraction module 270 to determine respective corner points 2010 of each PV module 514*b* in the PV string 512*b* from all three EL frame images 2000*a*, 2000*b*, 2000*c*. The detected corner points of each PV module 514*b* are shown as black dots 2012 in each EL frame image 2000*a*, 2000*b*, 2000*c*. Notably, in this embodiment, the frame extraction module 270 fails to detect a particular corner point 2014 of a particular PV module 2016 in the first EL frame image 2000*a* in FIG. 21A.

All corner points 2010 detected in the first EL frame image 2000*a* of FIG. 21A are visualized as empty dots 2020 in the second EL frame image 2000*b* of FIG. 21B. Notably the empty dots 2030 are shifted slightly to the left compared to their corresponding black dots 2012 in the first EL frame image 2000*a* of FIG. 21A. This is due to the correction of point-to-point deflection. Once a local corner point density exceeds a certain threshold (two detected corner points 2010 is sufficient in this embodiment), the image processor 300 controls the frame extraction module 270 to generate a cluster point 2022. The cluster point's position is obtained by taking an average of all the corner points 2010 used to generate the cluster point 2022. This beneficially reduces the spatial detection error of individual corner points.

Referring to FIG. 21C, a cluster point 2022 is stored once the cluster point 2022 moves outside the EL frame image's border, as illustrated by the cluster point 2030 in the EL image 2000c. Cluster points 2022 inside the EL frame image's border are discarded once too many EL frame images add no more corner points 2010 to the cluster point. Cluster points 2022 inside the EL frame image's border, such as the cluster point 2032 in the EL image 2000c, are kept as long as a ratio of the EL frame images adding new corner points 2010 to the EL frame images adding no corner points 2010 is above a certain threshold. All cluster points 2022 are then meshed by the frame extraction module 270 to generate/construct rectangular-like quadrilaterals or frames. Each frame is constructed from the cluster points 2022 of the respective PV modules that is contained in each frame.

Figure 22:
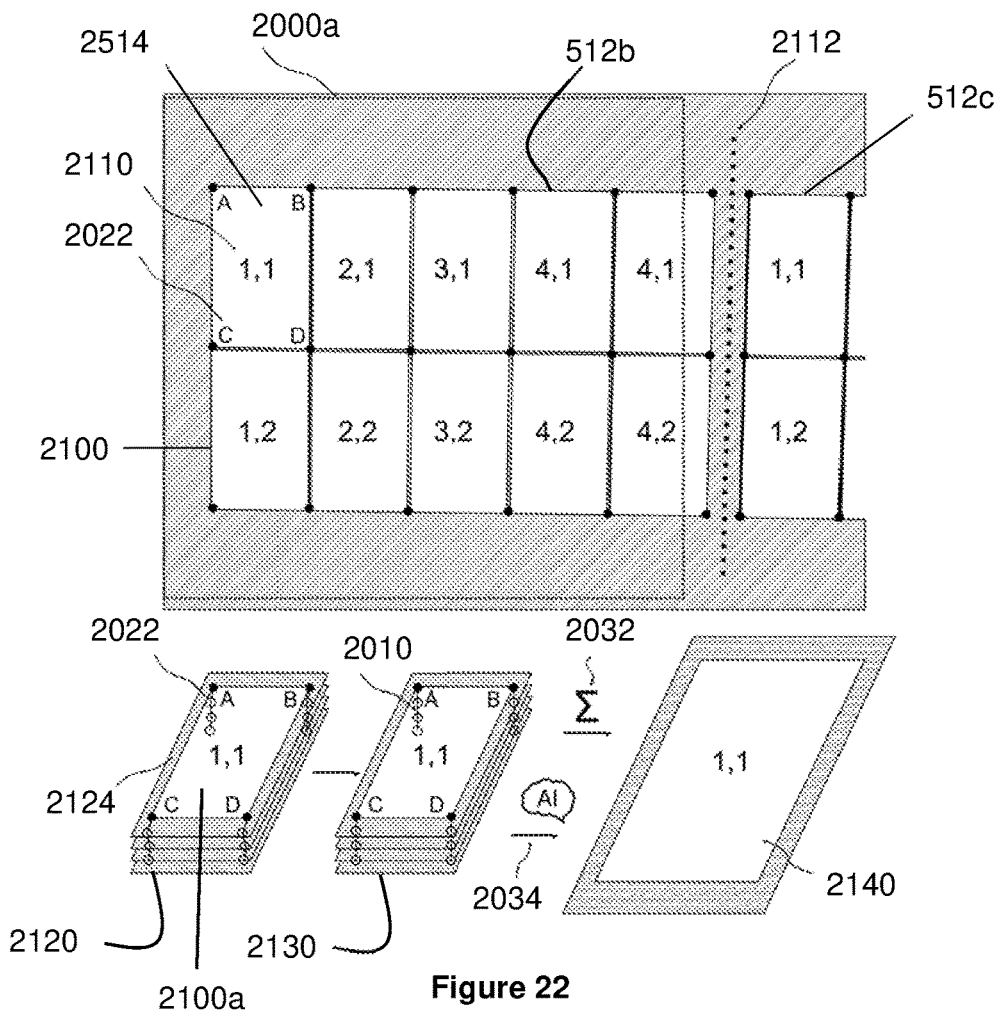
FIG. 22 is a schematic diagram of an image enhancement step being performed on the frames extracted as part of the FREEZE function of FIG. 21.

FIG. 22 illustrates the frames 2100 that are extracted from the frame extraction step being processed in the image enhancement step. The image processor 300 instructs the image enhancement module 280 to assign a horizontal and vertical module index 2110 to each frame 2100 according to its position in the PV string 512b. For example, the first frame which is associated with a particular PV module 2514 is located in the first row, and first column of the PV string 512b, and is assigned the horizontal and vertical module index [1,1].

The image processor 300 further controls the image enhancement module 280 to group the frames 2100 according to the PV module 514b contained in each frame (or similarly, according to their module index 2110). Each frame 2100 includes four cluster points 2022 (respectively marked 'A' to 'D'). The frames 2100 in each group are then arranged in a stacked arrangement (referred to as a stack) so that the cluster points 2022 that are marked with the same alphabet ('A'-'D') are stacked on top of each other. An exemplary stack 2120 having the module index [1,1] is shown in FIG. 22.

The image enhancement module 280 is further configured to discard the area 2124 that are not part of the frames 2100.

Using the exemplary stack 2120 as an example, the image enhancement module 280 is further configured to determine a reference frame having a highest image quality from the frames 2100 within the exemplary stack 2120. The image quality is evaluated based on sharpness, SNR and completeness of the PV module 514b within the frames.

The image enhancement module 280 is further configured to perform image alignment of the frames 2100. This is done using an image alignment algorithm such as 'Parametric Image Alignment using Enhanced Correlation Coefficient'. The image enhancement module 280 aligns the remaining frames 2100 in the exemplary stack 2120 to the reference frame. Image alignment is done by aligning the cluster points 2022 that are marked 'A' in the remaining frames to the corresponding cluster point 2022 that is marked 'A' in the reference frame to obtain image-aligned frames 2130.

The image enhancement module 280 is further configured to perform image averaging on the image-aligned frames 2130 to obtain an enhanced frame 2140 of the particular PV module 2514. Image averaging is performed using a super-resolution routine such as weighted image stack averaging 2032 and/or a dedicated deep convolutional network structure 2034. The enhanced frame 2140 has higher SNR (i.e. lower noise) and higher resolution (up to a resolution improvement factor of three) than the reference frame.

The same process is repeated for the remaining stacks to obtain respective enhanced frames for the remaining PV modules 514b in the PV string 512b. The image processor 300 further controls the image enhancement module 280 to determine the respective corner points 2010 of each enhanced frame and to remove any remaining perspective distortion in the enhanced frame.

The image processor 300 further controls the image enhancement module 280 to arrange the enhanced frames according to their module index 2110 to produce an enhanced EL image of the PV string. If distances between the PV modules 514b in the PV string 512b are similar, a single enhanced EL image is produced. If distances vary due to a large gap 2112 between two PV modules (which indicate that one of the PV modules belong to a separate PV string 512c), then a separate enhanced EL image is produced for the separate PV string 512c.

The image enhancement module 280 is further configured to scale the image intensities of each enhanced frame to reflect an intensity spectrum from the darkest to the brightest PV module 514b in the PV string 512b. Since the intensity scaling reduces a depth resolution of the PV module's intensity range, the enhanced frames for the respective PV modules 514b are stored together with the enhanced EL image of the PV string.

During image processing, image intensities are expressed in real or floating-point values. When visually displaying the resulting images, image intensities have to be assigned a brightness value between a darkest and a brightest displayable value. To reduce the influence of pixels with extreme image (or pixel) intensity values, a brightness range is defined by a lowest pixel intensity bin (dotted line 2201a) and a highest pixel intensity bin (dotted line 2201b) that contains a minimum number of pixels (referred before as the effective dynamic range).

Figure 23:
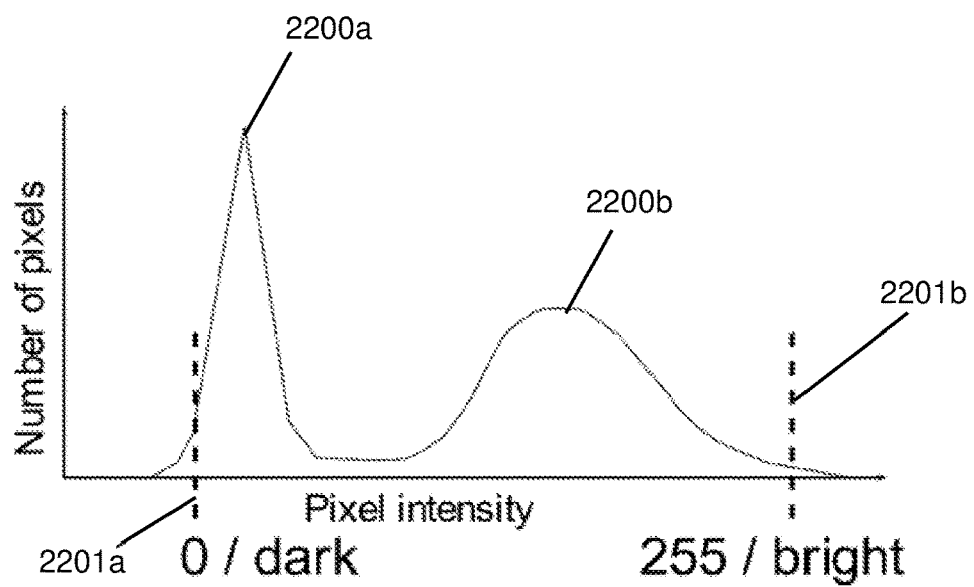
FIG. 23 is a pixel intensity histogram of an enhanced frame obtained from the image enhancement step of FIG. 22.

FIG. 23 displays a pixel intensity histogram of the enhanced frame 2140. Two peaks 2200a, 2200b can be seen corresponding to pixel intensities of a dark background and a bright EL signal respectively. A brightness range between the lowest pixel intensity bin (dotted line 2201a) and the highest pixel intensity bin (dotted line 2201b) is defined to exclude pixel intensities which do not occur in many pixels. In FIG. 23, pixel intensities below the lowest pixel intensity bin (left of the dotted line 2201a) is set to the minimum value (0) and pixel intensities above the highest pixel intensity bin (right of the dotted line 2201b) will be set to the maximum value that can be saved according to a chosen precision ($2^8-1=255$, for 8 bit images). Image intensities in-between will be scaled between the minimum value (0) and the maximum value (255) of the defined brightness range.

Figure 24:
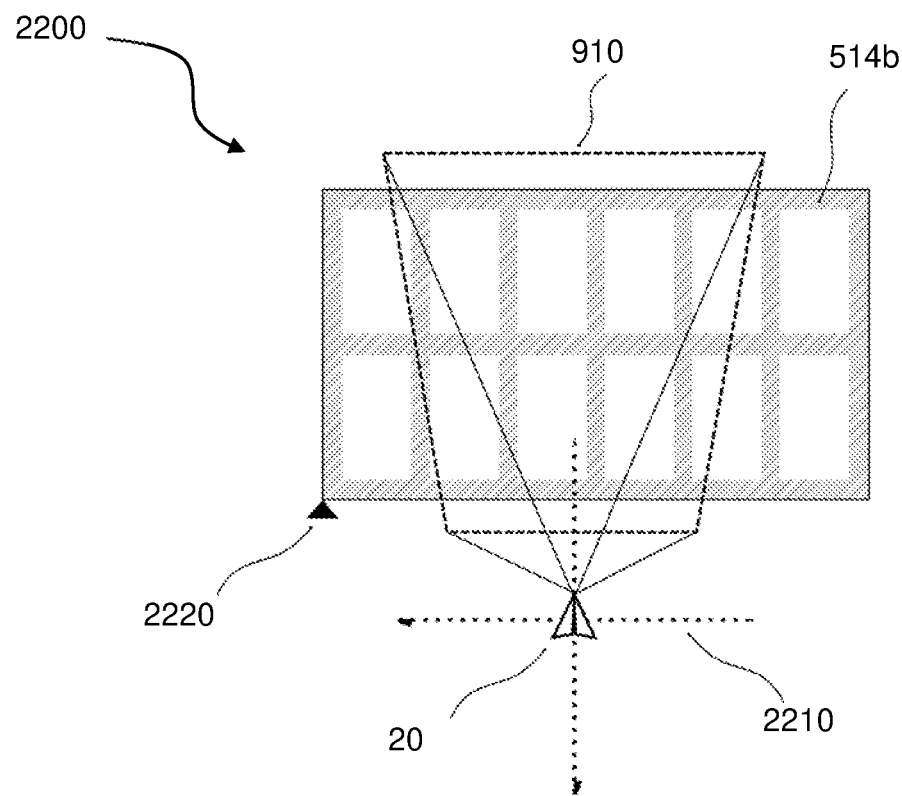
FIG. 24 is a schematic diagram of the enhanced EL image generated by the FREEZE function of FIGS. 21 to 23.

FIG. 24 illustrates the enhanced EL image 2200 of the PV string 512b after the image enhancement step is completed, and it is noted that resolution of the enhanced EL image 2200 is better than the resolution of the reference frame. Notably, independent of the scanning direction 2210, i.e. left-to-right, right-to-left, top-to-bottom, or any other combination, the enhanced EL image 2200 always aligns with the camera's yaw (i.e. optical axis 222a) since the EL images 2000a, 2000b, 2000c are captured with the camera's FOV 910 aligned to the PV string 512b. For ease of reference, a black triangle 2220 is used to indicate a bottom-left corner of the enhanced EL image 2200 with the enhanced EL image 2200 aligned with the camera's FOV 910.

Existing known methods may then be used to process the enhanced EL image 2200 to identify any defective PV modules of the PV string 512*b* based on the EL imaging. With a defective PV module identified, it might be helpful to know the defective PV module's geo-location. For this purpose, the mapping module 290 can be used.

The image processor 300 controls the mapping module 290 to execute the MAP function as illustrated in FIGS. 25 to 28. The mapping module 290 is configured to map the enhanced EL image 2200 of the PV string 512*b* onto a base-map of the PV string 2410. In order to identify the location of a PV module 514*b* (and thus, any defective PV module) in the PV string 512*b* from the enhanced EL image 2200, the following information is captured during the SCAN function, processed, and stored: frame-dependent timed geo-location (such as time, latitude, longitude, altitude) and camera orientation (e.g. yaw, pitch, roll). This information is stored in the meta-data 1920 of every captured EL image/video (refer to FIG. 20).

The image processor 300 controls the mapping module 290 to map the enhanced image onto the base-map by orientating the enhanced image to align the PV array subsection in the enhanced image to the PV array subsection in the base-map. If the geo-location of the PV string 512*b* in the enhanced EL image 2200 is known, but not its orientation (i.e. camera's yaw), there are four possible orientations with respect to the black triangle 2220 (0°, 90°, 180°, 270° of rotation) to align the image with a PV string in a base-map layer. Commercially available PV modules generally have cell grids of 4×8, 6×10 or 6×12 cells, and are generally rectangular and not square. In such cases, only two of the four orientations are plausible: 0° and 180° of rotation with respect to the black triangle 2220. This is explained in further detail with reference to FIGS. 25A, 25B and 25C which illustrate three enhanced EL images 2310, 2320, 2330 with PV modules arranged in two rows, and two, three and five columns respectively.

Figures 25A, 25B, 25C:
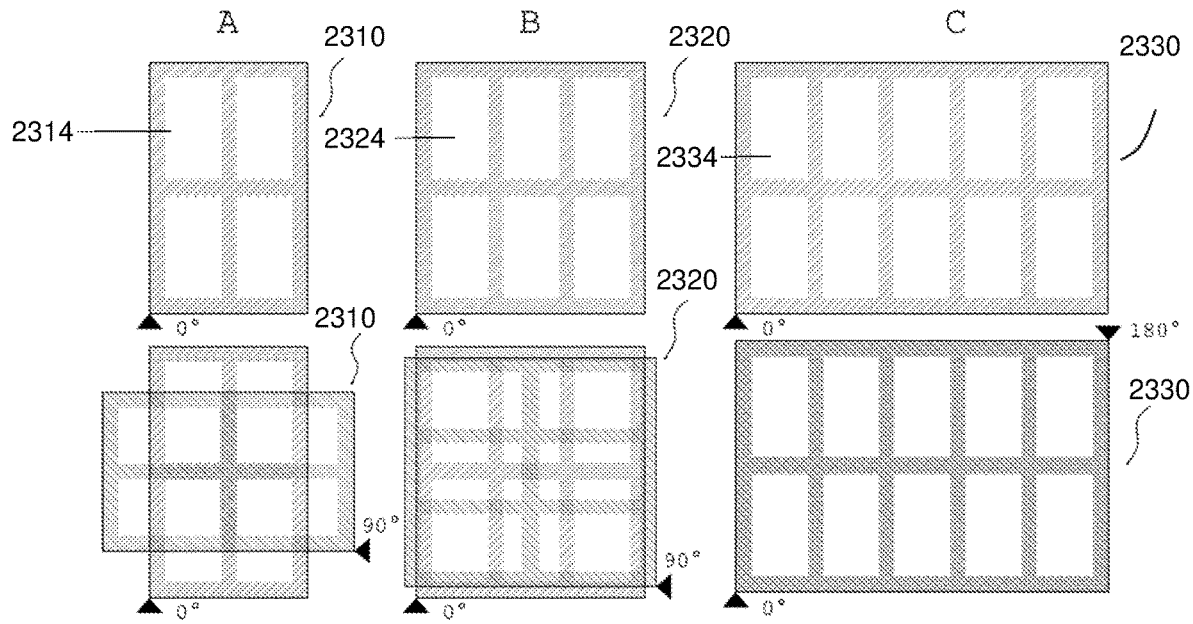
FIG. 25A is a schematic diagram of an enhanced EL image with PV modules arranged in two rows and two columns during a first part of the MAP function as part of the exemplary method of FIG. 4.
FIG. 25B is a schematic diagram of an alternative to FIG. 25A with the enhanced EL image having PV modules arranged in two rows and three columns.
FIG. 25C is a schematic diagram of an alternative to FIG. 25A with the enhanced EL image having PV modules arranged in two rows and five columns.

The enhanced EL image 2310 in FIG. 25A has the same number of rows and columns. Due to the shape of the PV module 2314, two of the four orientations (90° and 270° of rotation with respect to the black triangle 2220) will result in the enhanced EL image 2310 being skewed wrongly when the enhanced EL image 2310 is mapped onto a base-map of its PV string.

Even though the enhanced EL image 2320 in FIG. 25B has a square shape, the enhanced EL image 2320 has a different number of PV modules 2324 in its row and column. In two of the four orientations (90° and 270° of rotation with respect to the black triangle 2220), the number of PV modules 2324 in a row or column would not match the number of PV modules 2324 in the same row or column of its PV string in the base-map.

The enhanced EL image 2330 in FIG. 25C is depicted with two orientations (0° and 180° of rotation with respect to the black triangle 2220). As can be seen, only these two orientations will result in an equally un-skewed image matching its base-map.

Figure 26:
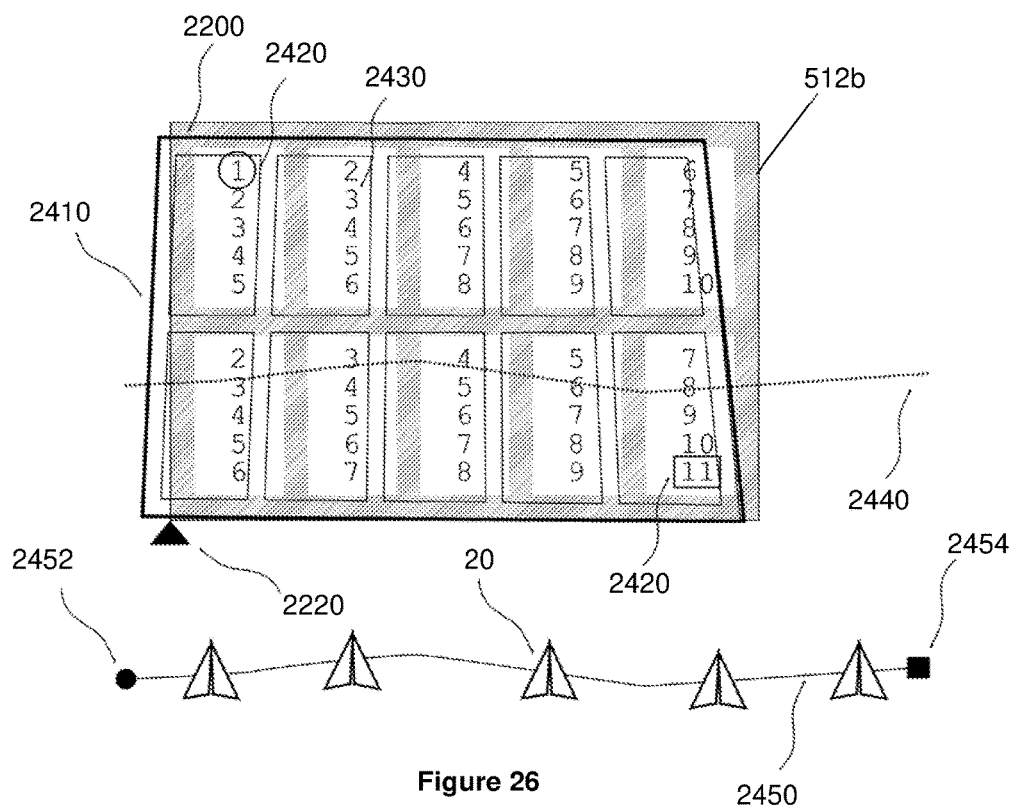
FIG. 26 is a schematic diagram of the enhanced EL image being mapped onto a base-map during a second part of the MAP function of FIGS. 25A-C.

FIG. 26 illustrate the enhanced EL image 2200 mapped onto a base-map 2410 of the PV string 512*b*. Since the PV string 512*b* has a longitudinal axis (i.e. the array axis 10*a* in FIG. 1), and the camera 222 is arranged to capture the EL images of the PV string 512*b* with the predefined size ratio, no single EL image captures the entire PV string 512*b*. Specifically, in this embodiment, eleven EL images of the PV string 512*b* are captured. Each EL image is associated with a unique image identifier 2420. In this embodiment, each EL image is numbered in ascending order from 1 to 11.

When a particular EL image is used for image averaging to produce an enhanced frame, the image processor 300 further instructs the mapping module 290 to associate the image identifier 2420 of the particular EL image with the enhanced frame. For example, the enhanced frame 2430 is associated with unique number identifiers '2', '3', '4', '5' and '6'. In other words, the corresponding frames extracted from the EL images '2', '3', '4', '5', and '6' are used for image averaging to produce the enhanced frame 2430.

The mapping module 290 is then able to determine the orientation (from the two available orientations: 0° and 180° of rotation with respect to the black triangle 2220) of the enhanced image 2200 based on the image identifiers 2420 associated with each enhanced frame. The enhanced frames associated with the image identifier '1' represents the frames that are captured at the start of the SCAN function as opposed to the enhanced frames associated with the image identifier '11' which represent the frames that are captured at the end of the SCAN function.

Further indicators for position and orientation of the enhanced EL image 2200 within the base-map 2410 are discussed. An approximate center position 2440 of the camera's FOV 910 along the PV string 512*b* can be calculated from the UAV's flight path 2450 (including flight start 2452 and flight end 2454), flight altitude and camera orientation.

FIG. 27 is a schematic diagram 2500 illustrating a side view of the UAV 20 during the SCAN function for approximating the center position 2440 of the camera's FOV 10 along the PV string 512*b*. The UAV 20 has an altitude 2510 above ground of $d_z$. The camera 222 is aligned at a pitch angle 2520 relative to the ground of a. The pitch angle 2520 is aligned to the tilt angle 2530 of the PV string 512*b* relative to the ground. The distance 2540 between the camera 222 and PV string 512*b* is $d_L$. The distance 2540 is readily available from a LIDAR reading or as measured by the LIDAR 224 during the FOCUS function. The horizontal distance 2550 between the UAV 20 and the PV string 512*b* is $d_{xy}$. The horizontal distance 2550 can then be calculated either based on $d_L$ using Equation (3):

$$d_{xy,1} = d_L \cdot \cos(\alpha) \quad (9)$$

Or based on the $d_z$ and the height 2560 of the PV string 512*b* from the ground $d_{PV}$ using Equation (4):

$$d_{xy,2} = (d_z - d_{PV}) \cdot \tan(\alpha) \quad (10)$$

Equation (9) is preferred over Equation (10) because $d_{xy,2}$ requires the height of the imaged object ($d_{PV}$) to be known or estimated. Further, the UAV 20 estimates $d_z$ barometrically which may be erroneous for longer flight times and changing weather.

Referring to FIG. 27, the center position 2440 of the camera's FOV 910 is within the PV string 512*b* while that UAV's flight path 2450 is slightly below. With high quality location data and a simple PV string interconnection (which is the case for PV string 512*b*), the mapping module 290 is able to map the enhanced EL image 2200 onto the base-map 2410 accurately without further input. Where there are more complex PV string interconnections and/or low-quality location data, further input on the PV string is obtained through comparing measurement number, switcher box channel and information regarding which inverter box or combiner box 16 is connected to which switcher box channel and at what time.

FIG. 28A illustrates an exemplary enhanced EL image 2610 being mapped onto an exemplary base-map 2620 using a string alignment method. FIG. 28B illustrates an exemplary enhanced EL image 2630 being mapped onto an exemplary base-map 2640 using a module alignment method.

Referring to FIG. 28A, for the string alignment method, the corner points 2622 of the base-map 2620 is known and the enhanced EL image 2610 is roughly aligned on top of the base-map 2620. If the base-maps contain multiple PV strings below the enhanced EL image 2610, the PV array 2620 sharing most overlapping area with the enhanced EL image 2610 is chosen. The four corner points 2612 of the enhanced EL image 2610 are then affine- or perspective aligned 2624 by the mapping module 290 to the corner points 2622 of the PV string inside the base-map 2620, and according to the most similar orientation.

Referring to FIG. 28B, in this embodiment, the number of PV modules in the enhanced EL image 2630 do not match the number of PV modules in the base-map 2640. This happens when the enhanced EL image is generated from only a part of a scanned PV string or the interconnection of the PV modules within the PV string does not follow a regular pattern. In this case, in addition to the corner points 2642 of the base-map 2640, the number of modules in each row and column of the PV string must be known. Furthermore, the PV modules within the enhanced EL image 2630 must be roughly aligned with the PV modules of the base-map 2640. The image processor 300 then instructs the mapping module 290 to obtain an affine- or perspective image transform from the deflection vectors of the corners points 2632 in the enhanced EL image 2630 to all corresponding corner points 2642 of the PV modules in the base-map 2640. The image processor 300 further instructs the mapping module 290 to map the enhanced EL image 2630 onto the base-map 2640 based on a largest overlap of the corner points 2632 with the corner points 2642, and according to most similar orientation.

Once the enhanced EL image 2200, 2610, 2630 is mapped onto the base-map 2410, 2620, 2640, information about the geo-location (such as GPS coordinate) of a PV module defect that is identified in the enhanced EL image 2200, 2610, 2630 can be readily identified from the base-map 2410, 2620, 2640 for repair works and/or maintenance.

Advantageously, in light of the described embodiment, it is possible for the UAV 20 to take low resolution, monochromatic videos under dim light conditions and yet enhanced resolution and improved quality images may be produced to identify defective PV modules and to estimate PV module power loss. In particular, the onboard processing sub-system 240 is capable of autonomously navigating the UAV and executing the exemplary method 400.

Further, since information such as frame-dependent timed geo-location (such as time, latitude, longitude, altitude etc) and camera orientation (e.g. yaw, pitch, roll) are processed, it is possible to reproduce the location of a PV string of a certain EL image reliably and accurately.

It should be noted that the various embodiments described herein should not be construed as limitative. For example, the UAV 20 may be further equipped with an ultrasound device for additional distance measurements. Furthermore, the camera 222 may capture still EL images of the PV string under forward bias, or record a video of the PV string instead. Further, instead of a monochromatic sensor, a colour sensor can be used. Although the described embodiment uses 'PV string' as an example, any other PV electrical connections may be used, and broadly, the embodiment may be used with any PV array.

Other types of aerial vehicles, such as drones may be used, and not only UAVs.

While the exemplary method 400 is described as including all 8 functions: FOCUS, POINT, FIND, ALIGN, SCAN, AUTO, FREEZE, MAP, it is understood that the system 200 may execute any number of the functions, and in any reasonable order. For example, in an alternative embodiment, the onboard processing sub-system 240 may not execute the AUTO function as the worker 30 may want greater control of which PV string to inspect. In this case, the worker manually controls the switcher box 32 and power supply 36 after the SCAN function is completed and initiates the FIND or SCAN function accordingly. The image processing device 260 may also execute the FREEZE function without the MAP function.

Furthermore, the FOCUS function may be executed at all times throughout the method 400, especially while the SCAN function is in progress, to ensure the captured EL images have a high quality of sharpness. Alternatively, the FOCUS function need not be executed at all if the distance between UAV 20 and PV array 10 can be kept within a narrow range. In such an embodiment, fixed focus lenses without controlled focus adjustments may be used, instead of the focussing lens 223.

Moreover, in an alternative embodiment, the UAV 20 may remotely transfer the captured EL images to the image processing device 260 without first returning to the base.

Furthermore, the pre-determined maximum value ($d_{exp\_max}$) may be set up to 1.5.

In another example, the laser may not need to be turned off if the lens filter is arranged to filter out any optical interference from the laser.

In a further example, during the SCAN function, the predefined size ratio may also be set to keep a space of about 15% to 20% (or even higher, e.g. 20% to 25%) between the top and bottom of the PV string 512b and image border 1410 to allow a greater tolerance to positional oscillations of the UAV 20, depending on how unstable the UAV 20 appears to be.

The invention claimed is:

1. A method of processing electroluminescence (EL) images of a photovoltaic (PV) array, comprising:
   extracting a plurality of frames of a PV array subsection of the PV array from the EL images, the PV array subsection including one or more PV modules of the PV array;
   determining a reference frame having a highest image quality of the PV array subsection from among the extracted frames of the PV array subsection;
   performing image alignment of the extracted frames to the reference frame to generate image aligned frames of the PV array subsection by:
      stacking the extracted frames of the PV array subsection in an image stack arrangement, wherein respective corner points of the PV modules of the PV array subsection are stacked; and
      aligning the respective corner points of each PV module in the extracted frames stacked in the image stack arrangement to corresponding corner points of a corresponding PV module in the reference frame; and
   processing the image aligned frames of the PV array subsection to produce an enhanced image of the PV array subsection having a higher resolution than the reference frame.

2. The method according to claim 1, wherein extracting the plurality of frames from the EL images comprises:
   determining the respective corner points of each PV module in the EL images; and constructing respective frames for each PV module based on the respective corner points of each PV module.

3. The method according to claim 1, wherein determining the reference frame having the highest image quality comprises evaluating image quality of each frame of the plurality of frames based on at least one of sharpness, signal-to-noise ratio, and completeness of the plurality of frames.

4. The method according to claim 1, wherein processing the image aligned frames of the PV array subsection comprises grouping the image aligned frames according to each PV module in each of the image aligned frames; and performing image averaging on each group of image aligned frames to obtain respective enhanced frames for each PV module.

5. The method according to claim 4, wherein the image averaging is based on at least one of a weighted image stack averaging or a deep convolutional neural network structure.

6. The method according to claim 4, further comprising associating each of the enhanced frames with a horizontal index and a vertical index according to each PV module's position in the PV array subsection; and arranging the enhanced frames according to its horizontal and vertical index to produce the enhanced image of the PV array subsection.

7. The method according to claim 4, further comprising scaling respective image intensities of each of the enhanced frames.

8. The method according to claim 1, further comprising mapping the enhanced image of the PV array subsection onto a base-map of the PV array subsection, the base-map including a geo-location of each PV module.

9. The method according to claim 8, wherein mapping the enhanced image onto the base-map comprises orientating the enhanced image to align the PV array subsection in the enhanced image to the PV array subsection in the base-map.

10. An image processing device for processing electroluminescence (EL) images of a photovoltaic (PV) array, comprising:
an image processor configured to:
extract a plurality of frames of a PV array subsection of the PV array from the EL images, the PV array subsection including one or more PV modules of the PV array;
determine a reference frame having a highest image quality of the PV array subsection from among the extracted frames of the PV array subsection;
perform image alignment of the extracted frames to the reference frame to generate image aligned frames of the PV array subsection by:
stacking the extracted frames of the PV array subsection in an image stack arrangement, wherein respective corner points of the PV modules of the PV array subsection are stacked; and
aligning the respective corner points of each PV module in the extracted frames stacked in the image stack arrangement to corresponding corner points of a corresponding PV module in the reference frame; and
process the image aligned frames of the PV array subsection to produce an enhanced image of the PV array subsection having a higher resolution than the reference frame.

11. The image processing device according to claim 10, wherein the image processor is further configured to extract the plurality of the frames from the EL images by:
determining respective corner points of each PV module in the EL images; and
constructing respective frames for each PV module based on the respective corner points of each PV module.

12. The image processing device according to claim 10, wherein the image processor is further configured to determine the reference frame having the highest image quality by evaluating the image quality of each frame of the plurality of frames based on at least one of sharpness, signal-to-noise ratio, and completeness of the plurality of frames.

13. The image processing device according to claim 10, wherein the image processor is further configured to process the image aligned frames of the PV array subsection by grouping the image aligned frames according to each PV module in each of the image aligned frames; and perform image averaging on each group of image aligned frames to obtain respective enhanced frames for each PV module.

14. The image processing device according to claim 13, wherein the image processor is further configured to perform image averaging based on at least one of weighted image stack averaging or a deep convolutional neural network structure.

15. The image processing device according to claim 13, wherein the image processor is further configured to associate each of the enhanced frames with a horizontal index and a vertical index according to each PV module's position in the PV array subsection; and arrange the enhanced frames according to its horizontal and vertical index to produce the enhanced image of the PV array subsection.

16. The image processing device according to claim 13, wherein the image processor is further configured to scale respective image intensities of each of the enhanced frames.

17. The image processing device according to claim 10, wherein the image processor is further configured to map the enhanced image of the PV array subsection onto a base-map of the PV array subsection, the base-map including geo-location of each PV module.

18. The image processing device according to claim 17, wherein the image processor is further configured to map the enhanced image onto the base-map by orientating the enhanced image to align the PV array subsection in the enhanced image to the PV array subsection in the base-map.

19. A method of obtaining an enhanced image of a photovoltaic (PV) array subsection of a PV array from electroluminescence (EL) images of the PV array subsection captured by an aerial vehicle having a camera, the method comprising:
controlling the aerial vehicle to fly along a flight path to capture EL images of corresponding PV array subsections of the PV array;
deriving respective image quality parameters from at least some of the captured EL images;
dynamically adjusting a flight speed of the aerial vehicle along the flight path, based on the respective image quality parameters for capturing the EL images of the PV array subsections;
extracting a plurality of frames of the PV array subsection from the EL images;
determining a reference frame having a highest image quality of the PV array subsection from among the extracted frames of the PV array subsection;
performing image alignment of the extracted frames to the reference frame to generate image aligned frames of the PV array subsection by:
stacking the extracted frames in an image stack arrangement, wherein respective corner points of the PV modules of the PV array subsection are stacked; and aligning the respective corner points of each PV module in the extracted frames stacked in the image stack arrangement to corresponding corner points of a corresponding PV module in the reference frame; and processing the image aligned frames of the PV array subsection to produce an enhanced image of the PV array subsection having a higher resolution than the reference frame.

* * * * *